United States Patent
Patel et al.

(10) Patent No.: US 8,843,987 B2
(45) Date of Patent: Sep. 23, 2014

(54) METHODS AND APPARATUS THAT SUPPORT ADDRESSABLE INTERACTIVE APPLICATIONS

(75) Inventors: Vipul Babubhai Patel, Great Falls, VA (US); Jian Yu, Ashburn, VA (US); Mehul Shah, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/593,506

(22) Filed: Aug. 23, 2012

(65) Prior Publication Data

US 2014/0059636 A1 Feb. 27, 2014

(51) Int. Cl.
- H04N 7/173 (2011.01)
- H04N 21/6547 (2011.01)
- H04N 21/435 (2011.01)
- H04N 21/81 (2011.01)
- H04N 5/44 (2011.01)

(52) U.S. Cl.
CPC ........ H04N 21/4351 (2013.01); H04N 7/17318 (2013.01); H04N 21/6547 (2013.01); H04N 5/4401 (2013.01); H04N 21/8166 (2013.01)
USPC .......................................... 725/132; 725/105

(58) Field of Classification Search
CPC ............ H04N 21/435; H04N 21/4351; H04N 21/6547; H04N 21/8166; H04N 5/4401; H04N 7/17318
USPC ....................................................... 725/132
See application file for complete search history.

(56) References Cited

U.S. PATENT DOCUMENTS

| | | | |
|---|---|---|---|
| 8,046,798 B1 * | 10/2011 | Schlack et al. | 725/46 |
| 8,132,203 B2 * | 3/2012 | de Heer | 725/34 |
| 8,549,576 B2 * | 10/2013 | Slothouber et al. | 725/118 |
| 2001/0003184 A1 * | 6/2001 | Ching et al. | 707/4 |
| 2002/0019817 A1 * | 2/2002 | Matsui et al. | 707/1 |
| 2006/0130120 A1 * | 6/2006 | Brandyberry et al. | 725/136 |
| 2007/0061724 A1 * | 3/2007 | Slothouber et al. | 715/716 |
| 2009/0177747 A1 * | 7/2009 | Agrawal et al. | 709/206 |
| 2010/0299715 A1 * | 11/2010 | Slothouber et al. | 725/118 |

(Continued)

OTHER PUBLICATIONS

OpenCable Specifications, Enhanced TV Binary Interchange Format 1.0, I06, Cable Television Laboratories, Jan. 28, 2011.*

(Continued)

*Primary Examiner* — Nasser Goodarzi
*Assistant Examiner* — Michael B Pierorazio
(74) *Attorney, Agent, or Firm* — Straub & Pokotylo; Michael P. Straub; Stephen T. Straub

(57) ABSTRACT

Methods and apparatus for supporting targeted advertising and/or other targeted applications in set top boxes which use data and/or applications, e.g., EBIF (Enhanced TV Binary Interchange Format) applications, are described. Application level targeting is supported in which an application running on different STBs presents different application behavior and/or presents different visual sub-elements depending on the content of a subscriber profile on the particular individual STB. In the case of addressability at the Application Layer an EBIF application can target different viewers by checking private User Preference Items at runtime. Addressability at the signaling/platform level is also supported allowing targeting of a specific application or a sub-element within an application to a specific target group. In this scenario the particular applications/sub-elements are loaded on the set-tops that belong to a target group, e.g., satisfy targeting constraints specified in private targeting metadata that is received in an MPEG stream.

18 Claims, 11 Drawing Sheets

(56) References Cited

U.S. PATENT DOCUMENTS

| | | | |
|---|---|---|---|
| 2011/0191213 A1* | 8/2011 | Mora et al. | 705/30 |
| 2011/0288912 A1* | 11/2011 | McCrea et al. | 705/14.2 |
| 2012/0072946 A1* | 3/2012 | Cranman et al. | 725/28 |
| 2012/0159528 A1* | 6/2012 | Toney, Jr. | 725/14 |
| 2012/0189285 A1* | 7/2012 | Ashley et al. | 386/331 |
| 2012/0265744 A1* | 10/2012 | Berkowitz et al. | 707/705 |
| 2013/0036007 A1* | 2/2013 | Lau et al. | 705/14.49 |

OTHER PUBLICATIONS

OpenCable Specifications, Enhanced TV Binary Interchange Format 1.0, I05, Cable Television Laboratories, Nov. 25, 2009.*

OpenCable Specifications, Enhanced TV Binary Interchange Format 1.0, I04, Cable Television Laboratories, Sep. 21, 2007.*

OpenCable Specifications, Enhanced TV Binary Interchange Format 1.0, I03, Cable Television Laboratories, Jul. 14, 2006.*

* cited by examiner

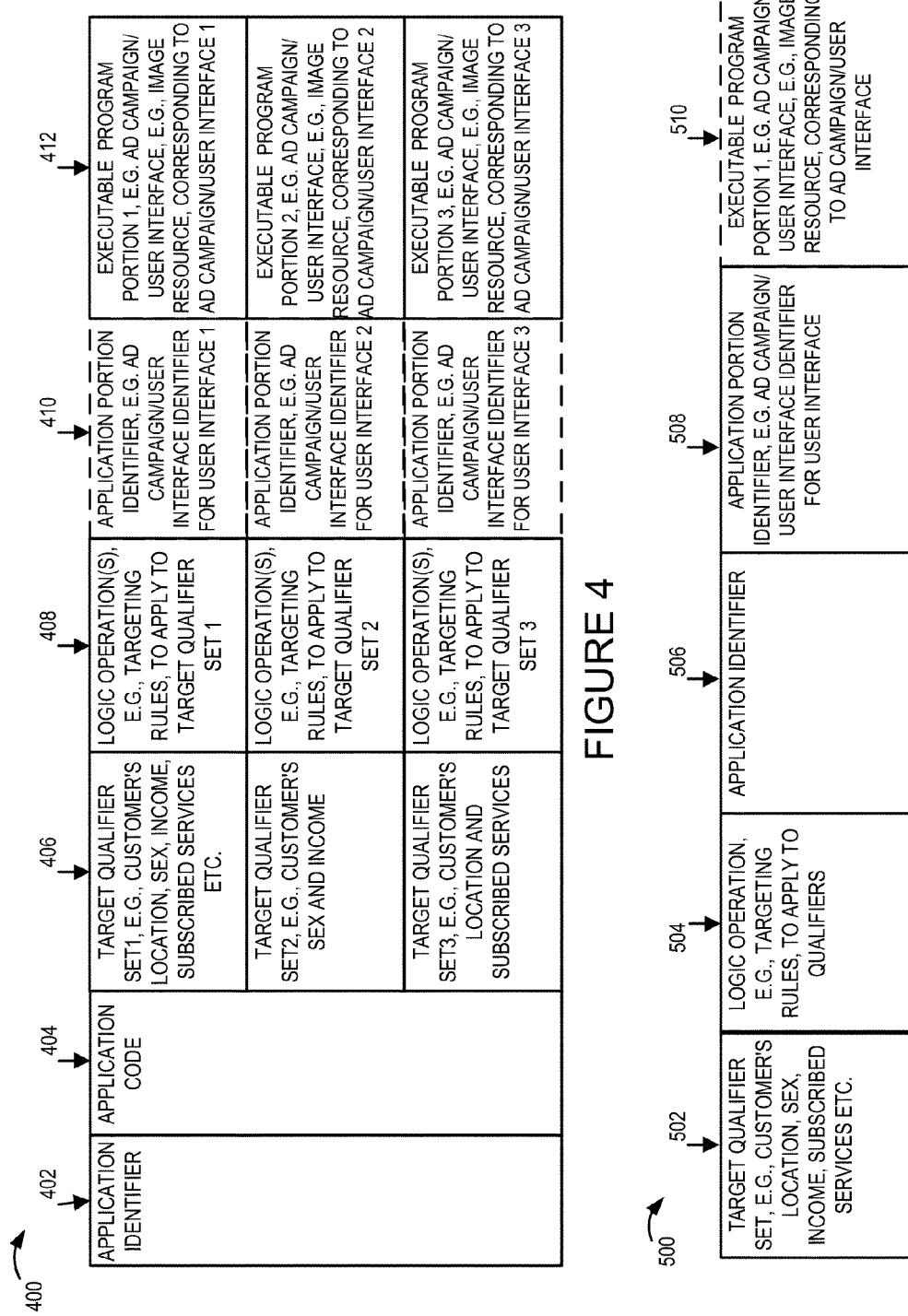

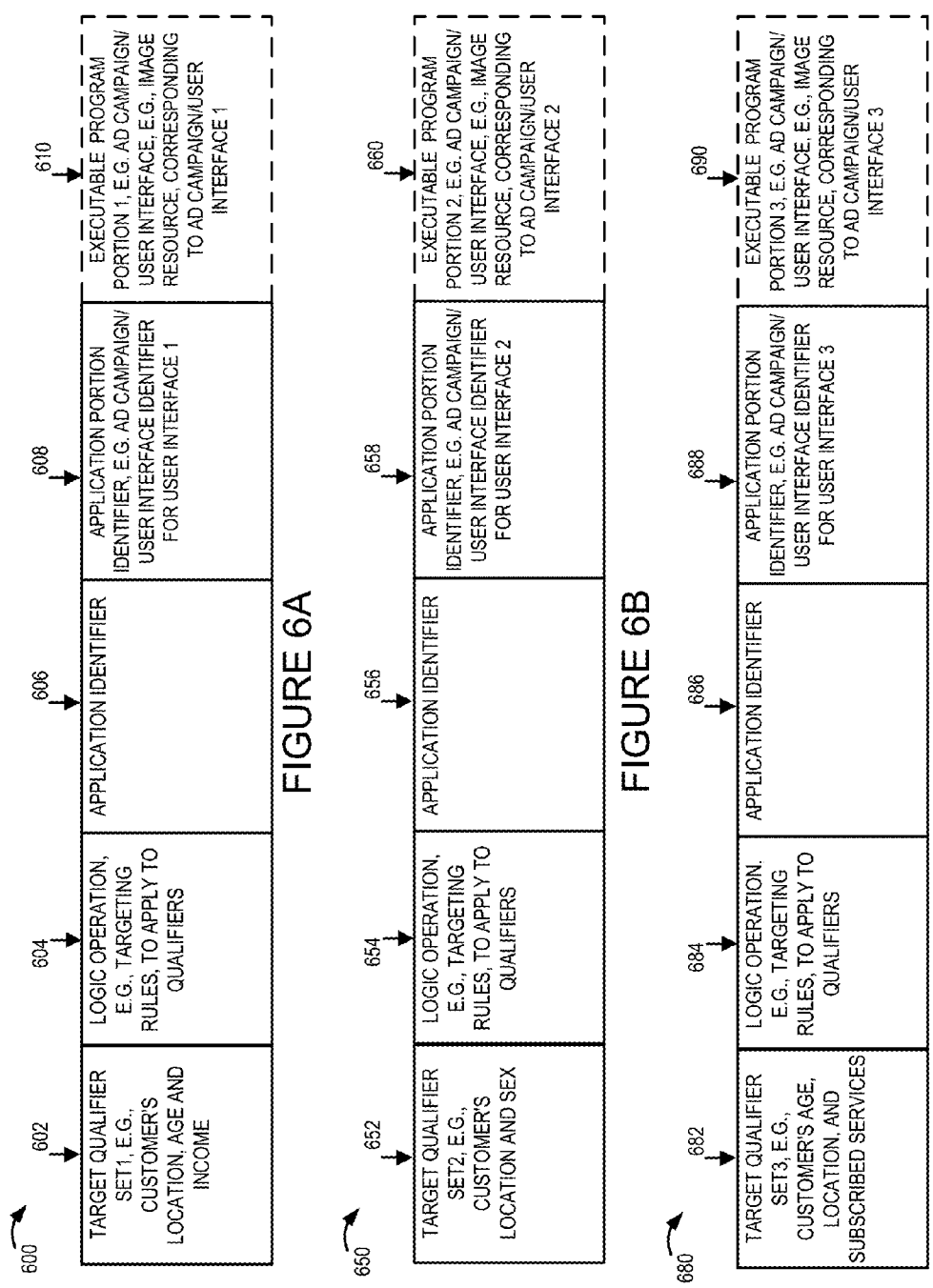

METHODS AND APPARATUS THAT SUPPORT ADDRESSABLE INTERACTIVE APPLICATIONS

FIELD OF THE INVENTION

The present invention relates to methods and apparatus which support addressable interactive applications, e.g., targeted advertising and/or other user targeted applications on set top boxes, e.g., EBIF (Enhanced TV Binary Interchange Format) applications and/or other types of applications.

BACKGROUND OF THE INVENTION

EBIF is the abbreviation for Enhanced TV Binary Interchange Format. The EBIF standard which has been developed as an OpenCable specification by Cable Television Laboratories, Inc. is described in the publicly available specification: Enhanced TV Binary Interchange Format 1.0, OC-SP-ETV-BIF1.0406-110128, (Jan. 28, 2011)

EBIF files communicate information and actions to be taken by an application such as, for example, an ETV user agent on a STB. The ETV (Enhanced Television) user agent will execute the actions specified an EBIF file such as present a multimedia page including content specified in an application and/or EBIF file. An application may include data, parameters used to determine the action to be taken, as well as data to be presented, e.g., displayed, based on user input and/or one or more actions being conditions being satisfied. While the current EBIF standard supports three standard User Preference Items which can be used in controlling an application, i.e., PostalCode, PrimaryLanguage, and Secondary Language, these user preference items are of only limited use in terms of targeting advertisements to users associated with the step top box on which an EBIF application is executed.

The EBIF and related OpenCable Tru-2-way specifications as published by CableLabs provide a framework that can be used to provide interactive applications that can be broadcast within a MPEG program to all the set-top receivers in the system and will be loaded, processed and run by all set-tops that are tuned to the specific program. Unfortunately, the specifications in their current format have limitations as there is no provision to target the application or its contents to a specific target audience within the system based on characteristics such as age, income levels, services to which a user already subscribes, etc. which can be important user characteristics for advertising and/or ad targeting purposes.

Advertising is an important source of revenue for cable companies, satellite companies and/or other content distributers. Advertisers are often willing to pay a premium if they are able to target their advertisements to a particular audience likely to be interested in their product and/or which is considered a desirable audience to target for a particular reason, e.g., because of their income level, age, sex or other characteristics.

In addition to providing content distributers a chance to sell targeted advertising, content distributers, e.g., cable service providers, internet service providers, etc., can find targeted advertising useful in up selling their own offerings by presenting advertisements for products which are upgrades to services and/or plans which a service subscriber has while avoiding presenting advertisements for services to which a subscriber already subscribes.

In view of the above discussion, it should be appreciated that it would be desirable if methods and/or apparatus could be developed which would allow for meaningful targeting of specific audiences via set top box applications using data and/or applications communicated in accordance with the EBIF standard and/or other formats and/or standards.

SUMMARY OF THE INVENTION

Methods and apparatus for enabling and implementing addressable interactive applications, e.g., set top box (STB) applications, that can be target to a specific user group, e.g., subscriber group or other group of users having one or more common characteristics or preferences are described. In various embodiments interactive applications running on a STB target users that match one or more user profile characteristics specified by the author of the interactive. The approach used to user targeting is not limited to can targeting of an entire application but can also be used to target specific sub-elements (pages) within the application to a specific target group.

The described methods and apparatus provide flexibility to utilize addressability at application level and present different application behavior and/or present different visual sub-elements for different target user groups. In some such exemplary embodiments the set-tops in the system run the same application but the behavior of the application is different based on the target group the set-top belongs to with the behavior to be provided to each of various groups being specified by the application. For example in the case of addressability at the Application Layer an EBIF application can target different viewers by checking the private User Preference Items at runtime and apply the right logic to display the appropriate User Interface.

In another exemplary embodiment addressability at the signaling/platform level is used allowing targeting of a specific application or a sub-element within an application to a specific target group. In this scenario the particular applications/sub-elements are loaded on the set-tops that belong to the target group as specified in the signaling associated with targeting data that is received, e.g., private metadata that is received in an MPEG stream. Applications and/or application sub-elements that do not satisfy the targeting criteria applied to user profile information stored on a STB are not loaded on to the set top box. Thus, in accordance with this approach the applications/sub-elements which are not relevant to a set top box are not loaded and STBs with different subscriber profiles may, and normally will be, loaded with different applications and/or application elements. In such an embodiment a set top box which is associated with a user who does not satisfy the targeting criteria for a particular application would not be loaded with the particular application.

In some embodiments an end-to-end system for addressability includes: a server that can configure and manage the addressable qualifiers and attributes for the service delivery platform. In various embodiments, at any given time there is a finite set of addressable qualifiers/attributes defined for the system that are common to and can be used in regard to the subscribers within the system.

Based on the subscriber data provided/imported to the addressability server, the addressability server builds and manages profiles for individual subscribers associated with STBs as per the qualifiers specified. In some embodiments the server unicasts the subscriber profile associated with a STB in the system to the corresponding STB either through a push (e.g., server initiated transmission) or pull (e.g., STB initiated request) mechanism.

In some embodiments which use the pull mechanism, the system is configured for receivers, e.g., STBs, to poll the server periodically at a configured time intervals to sync and refresh the profile stored on the STBs, In some but not necessarily all embodiments the set-tops poll the server every at least once 24 hours to refresh the profile data. The polling for different STBs is staggered in some embodiments to evenly distribute the load on the server over all or a portion of a 24 hour period corresponding to a day.

Client software, e.g., a STB application, interacts with the addressability server to receive and store the subscriber profile information on the set-top receiver and makes it available to different software modules running on the set-top, such as the EBIF UA (EBIF User Agent), DPI, as well as to interactive applications that can run on the set-top through one or more APIs (Application Programming Interfaces).

The subscriber profile information includes addressable qualifier values which provide information about the subscriber and/or services to which the subscriber subscribes. One or more subscriber profiles corresponding to a subscriber can be stored on a STB, e.g., with different subscriber profiles corresponding to different organizations. The interactive applications, in some embodiments, include a digital navigator and EBIF User Agent software.

In some embodiments an application authoring tool is supported that can programmatically query, e.g., determine the set of usable qualifiers defined by the addressable server at any given time, and can provide them as options for the application developer to include as targeting qualifiers in one or more application that the developer is creating, e.g., as part of a marketing campaign.

In some embodiments a campaign manager module and/or scheduling system can query the qualifiers defined by the addressability server and can provide configuration options to the campaign manager and/or scheduling system allowing a campaign to target specific application(s) or STB users over time based on the qualifier set which is supported.

As discussed above, application level targeting is supported in some embodiments with an application executing one or more different application elements if the conditional logic and targeting qualifier set which define the constraint for executing the individual application elements are satisfied based on subscriber profile information stored on the STB. An application element can be a portion of an application with different application elements providing different functions and/or corresponding to different advertisements. Thus different application portions maybe executed depending on what targeting constraints a subscriber profile satisfies.

In various embodiments signaling level addressability is supported. For example, in some embodiments particular EBIF applications are loaded and executed if conditions set by conditional logic and corresponding targeting qualifier values, e.g., parameters specifying desired subscriber characteristics and/or other subscriber information, associated with an application are satisfied by addressable qualifier values in a user profile or other information set on a set top box. The addressable qualifier values included in a subscriber profile stored on a STB may, and in some embodiments are, parameters specifying various subscriber characteristics or other subscriber information such as service subscription information. Exemplary subscriber characteristics which may be targeted included sex, income level, age, etc.

In some embodiments an individual application or application element, e.g., page resource, is not sent with the conditional logic and targeting qualifier values corresponding to the individual application. Rather, in at least some such embodiments the individual application or application element is downloaded and executed in response to determining that the conditional logic and targeting constraints associates with the application or application element are satisfied by the addressable qualifier values stored in a STB, e.g., in a subscriber profile on the STB.

Applications, application elements as well as conditional logic and corresponding targeting qualifier values may be sent to an application in a plurality of ways. In some embodiments, an MPEG transport stream of a program channel is used to deliver targeting information, applications, application elements and/or conditional logic used to determine which applications and/or application portions should be loaded and/or executed by the STB.

Different organizations may generate and store different subscriber profiles on the same set top box with each of the different subscriber profiles corresponding to the same subscriber being identified as being associated with a particular organization. For example, a STB may, and in some embodiments does store a first subscriber profile corresponding to a first organization, e.g., a Time Warner Cable (TWC) subscriber profile, for a subscriber and also store a subscriber profile corresponding to a second organization, e.g., a Verizon telephone subscriber profile, for the same subscriber. The different subscriber profiles corresponding to the same subscriber may include the same or different addressable qualifier values depending on the information available to the organization to which the subscriber profile corresponds.

Organization identifiers may, and in some embodiments are, provided with conditional logic and targeting qualifier values, to facilitate identification of which of a plurality of subscriber profiles corresponding to a subscriber are to be used when determining whether an application portion is to be loaded and/or executed. For example, a TWC organization identifier may, and in some embodiments is, included with conditional logic and targeting qualifier values so that a STB receiving the conditional logic and targeting qualifier values will know to use the addressable qualifier values of the TWC subscriber profile as opposed to those included in another organization's subscriber profile, when determining if a particular application or application element, e.g., a TWC application or application element should be executed.

The methods and apparatus of the present invention are well suited for a wide variety of applications. Exemplary applications include ETV EBIF applications and other applications.

Various additional features and advantages of the present invention are discussed in the detailed description which follows.

BRIEF DESCRIPTION OF THE DRAWINGS

FIG. 4 illustrates an application, e.g., STB application, in accordance with an exemplary embodiment of the invention, including a plurality of target qualifiers sets, and for each of the target qualifier set corresponding logical operators used to specify conditions which need to be satisfied prior to execution of a corresponding executable portion of the application.

FIG. 5 illustrates an exemplary application element, e.g., application information and/or code, which can be delivered on a program channel, e.g., as part of a program and/or MPEG stream, and processed by a STB to provide functionally if conditions specified in the application element are satisfied.

FIG. 6A through 6C illustrate various exemplary application elements of the type illustrated in FIG. 5, which can be delivered to a STB to provide different functionality depending on which constraints are satisfied, e.g., by the content of a user subscriber profile stored on the STB.

DETAILED DESCRIPTION

Figure 1:
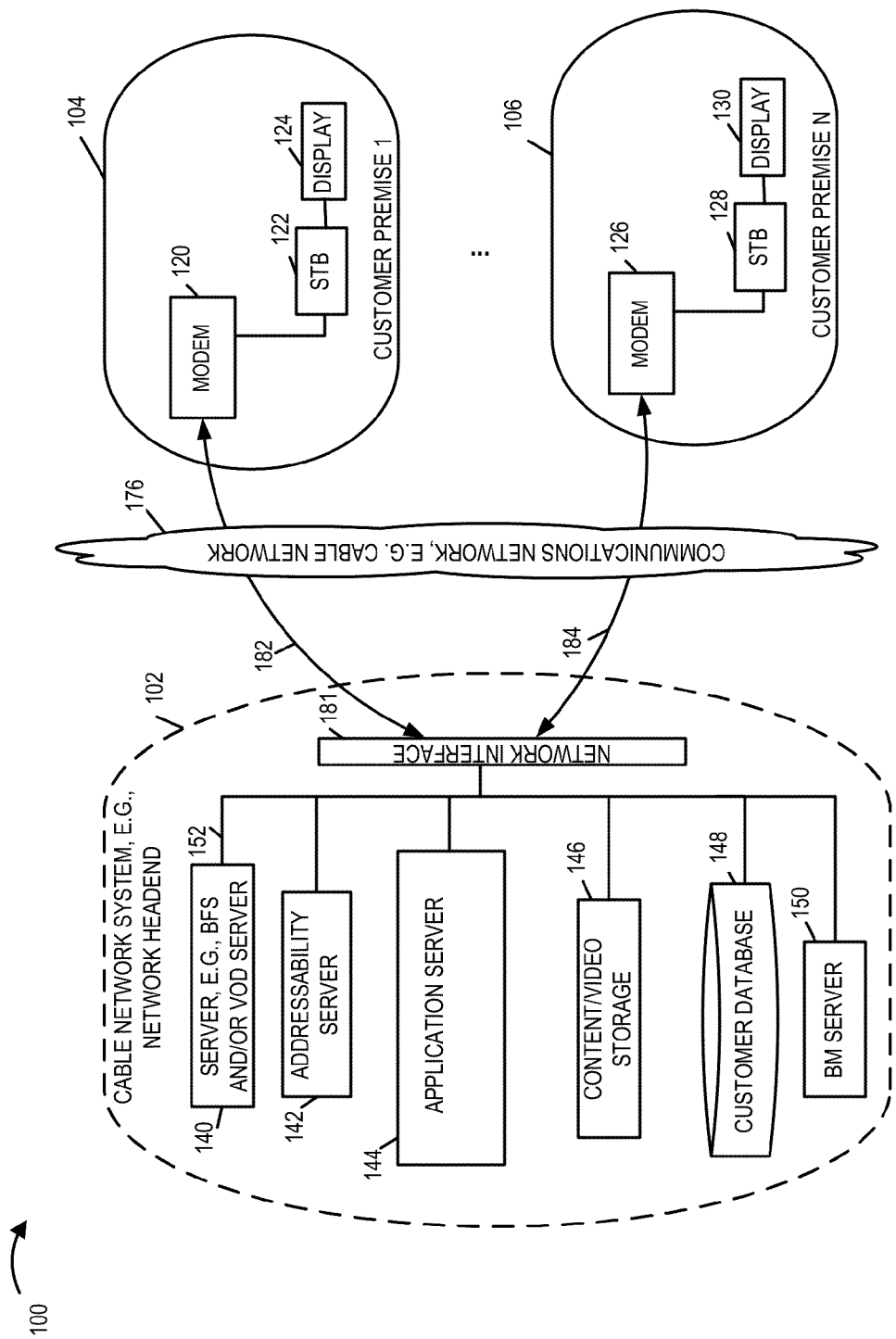
FIG. 1 illustrates an exemplary system implemented in accordance with some embodiments of the present invention.

FIG. 1 illustrates a system 100 implemented in accordance with some exemplary embodiments of the present invention. The system 100 supports content delivery, e.g., video and audio content and/or other application data delivery, to customer devices, e.g., content playback devices. The content playback devices may, and in some embodiments do include set top boxes, internet capable TVs, computers, mobile cellular phones with internet capability, etc. Thus, mobile as well as fixed content playback devices are supported in at least some embodiments.

The system 100 includes a service provider system 102, e.g., cable network headend, and a plurality of customer premises 104, 106. In the discussion, service provider system 102 is also referred to as the headend 102.

The service provider system/headend 102 may be implemented at a service provider's office or site including multiple servers and databases which are coupled together. In the FIG. 1 example, the headend 102 includes a server, e.g., broadcast file server (BFS) and/or video-on demand (VOD) server 140, an addressability server 142, an application server 144 which includes an ETV application server, content video storage system 146, customer database 148, and a business management server 150. It should be appreciated that one or more of the various servers and/or elements shown to be included in the headend 102, in some embodiments, reside outside the headend 102. In some embodiments one or more of the servers and/or elements is implemented in a distributed manner, with portions of the server or element residing at different locations in system 100. The various servers and other components included in the headend 102 are coupled together by a local network 152. The local network 152 is coupled via one or more network interfaces 181 to other networks and/or devices. For example, the headend 102 is coupled via network interface 181 to service provider's communications network 176, e.g., a cable network, and may also be coupled to one or more other external networks.

Via the communications network 176, the devices in the network headend 102 can send and receive signaling and/or other information to the devices located at the customer premises 104, 106 coupled to the cable network 176. Each customer premise 104, 106 includes a modem 120, 126, a set top box 122, 130 and a display device 124, 132 respectively. In some embodiments, modems 120,126 are cable modems. The display device could be, e.g., an external television. It should be appreciated that each of the STBs 122, 130 can be integrated in a device which also includes a display. The STBs support video and, optionally, E-mail functionality. The STBs 122, 130 can be used to send information to the headend 102 in addition to receiving signaling and/or information from the headend 102. In addition, in some embodiments each customer premise 104, 106 may include one or more IP devices that support internet protocol, such as a personal computer (PC), laptop, cell phone, etc., in addition to the STBs. The STBs 122, 130 may, and often do, include DVR functionality and the storage of user selected content. It should be appreciated that customer premise 104, 106 may also include additional STBs and display devices in addition to the ones shown in the figure. In some embodiments external modems such as 120, 126 are not included at the customer premise 104, 106 rather in such embodiments the STBs 122, 130 include a built in modem.

As shown in FIG. 1, communications link 182 traversing the service provider's cable network 176 couples modem 120 to the network head end 102's network interface 181. Similarly, modem 126 in the customer premise n 106 is coupled to service provider's system 102's network interface 181 via link 184 which traverses the service provider's network 176.

The BFS and/or VOD server 140, among other things, is responsible for delivering programming content and/or other information to one or more customer STB devices, e.g., including STB 122 and STB 130. Exemplary delivered programming content includes video on-demand content ordered by one or more customers to the customer devices, e.g., to STB 122 and/or other customer devices. In some embodiments a BFS server and a VOD server are implemented as separate individual servers.

The addressability server 142 configures and manages the addressable qualifiers and attributes for the service delivery platform. In various embodiments, at any given time, there is a finite set of addressable qualifiers/attributes defined for a system that are common to all the subscribers within the system. The maximum number for the finite set is determined by the resource constraint on the various components of the system. The addressability server 142 generates and manages customer/subscriber profiles for a plurality of customers served by the headend 102. The customer/subscriber profiles are generated based on a defined set of addressable qualifiers/attributes and additional customer/subscriber information provided/imported to the addressability server 142.

Exemplary application server 142 generates and provides applications and application data, e.g., such as initial page resources, data/image resources, target qualifier sets, and/or other application specific data corresponding to various applications, to customer premise devices such as STBs. In various embodiments the application server 144 includes an ETV application server.

The customer database 144 includes customer information corresponding to a plurality of customers, including customer account information, customer subscription/service information, and information regarding the devices installed at customer premises. In some embodiments customer account information includes, e.g., customer account number, customer subscription/service information, and other billing related information. Customer device information includes device identification and/or other information regarding customer devices such as STBs, modems etc., installed at various customer premises served by the headend 102. The information in the customer database 144 can, and in some embodiments is, used to generate subscriber profiles which are loaded onto the STB of the subscriber to which the generated subscriber profile corresponds. The subscriber profiles include account, service subscription and/or other information represented in the form of addressable values, e.g., parameters, which provide information about the subscriber and/or services to which the subscriber subscribes.

BM (Business management) server 150 processes billing information corresponding to customers serviced by the network headend 102. This may include updating billing charge information in response to changes in services being provided to the customer, upgrades, new purchases, and/or other activity. Business management server 146 also processes services bill payment information, e.g., bill payment transactions, deductions from debit accounts, mail bills, and/or processes discount and/or other information.

Figure 2:
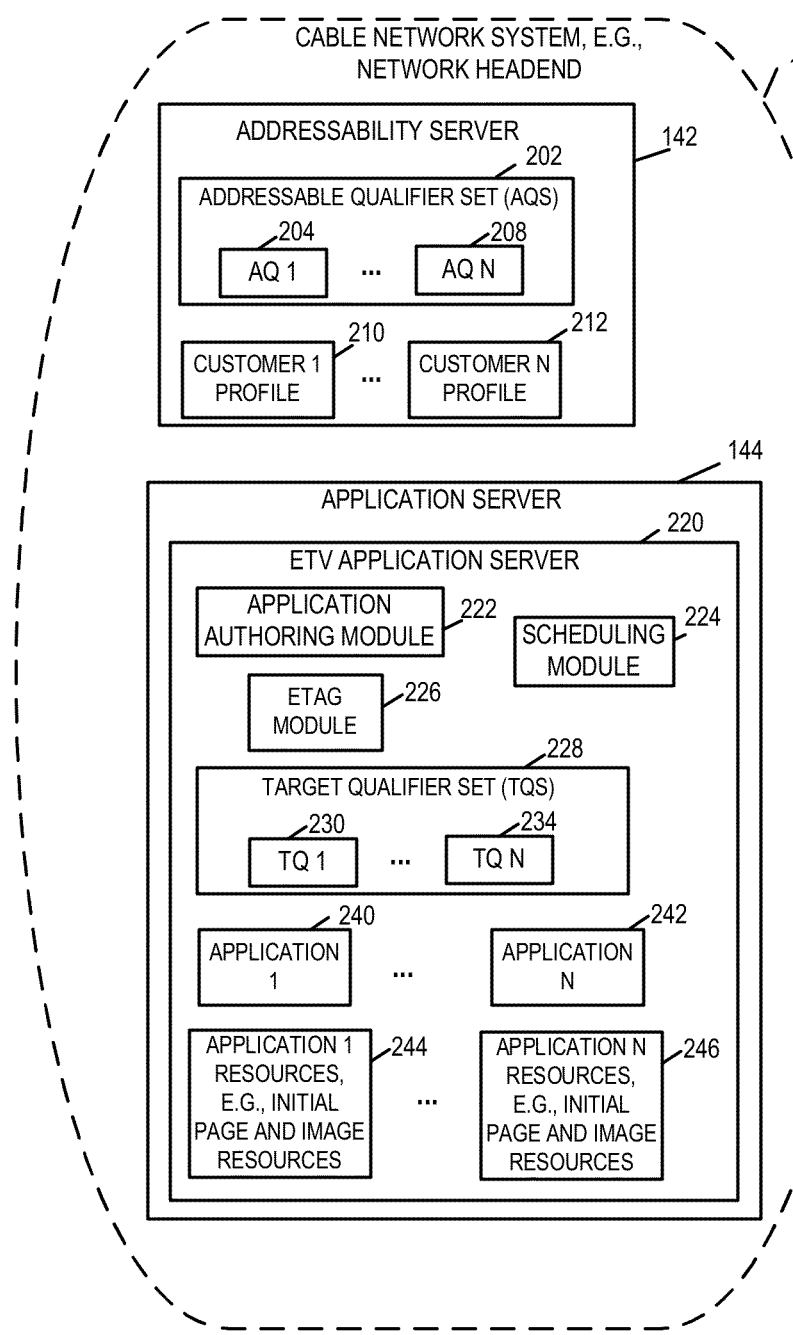
FIG. 2 is drawing illustrating a portion of the service provider's system/headend of FIG. 1 in greater detail.

FIG. 2 is drawing 200 illustrating a portion of the service provider's system/headend of FIG. 1 in greater detail. The illustrated portion of headend 102 shows the elements of the addressability server 142 and the application server 144 in greater detail.

The addressability server 142 includes an addressable qualifier set (AQS) 202 including a plurality of addressable qualifiers (AQs) 204 through 208, and a plurality of customer/subscriber profiles generated by the server 142. As discussed above, the addressability server 142 configures and manages the addressable qualifiers and attributes are common to all the subscribers within the system at a given time. The addressable qualifiers/attributes 204 through 208 can be defined in a number of ways, and in some embodiments include attributes corresponding to individuals, e.g., subscribers, such as Age, sex, subscriber's location, ethnicity, income level, subscribed services etc. However various other types of addressable qualifiers can be defined. Based on the specified addressable qualifiers in the set 202, the addressability server 142 generates and manages customer/subscriber profiles for a plurality of customers served by the headend 102.

In various embodiments the addressability server 142 unicasts each subscriber profile 210, 212, to the associated set-top receivers corresponding to the subscriber in the system either through push or pull mechanism. In some embodiments, for pull mechanism, the STBs in the system are configured to poll the server addressability server 142 periodically at a configured interval time to sync and refresh the profile stored on the set-tops. For example, the STBs may poll the server 142 every 24 hours to refresh the profile data.

The application server 144 includes an ETV application server 220 that generates and provides ETV applications and application data, e.g., such as initial page resources, data/image resources, target qualifier sets, and/or other application specific data corresponding to various ETV applications, to customer premise devices such as STBs. In various embodiments the ETV application server 220 includes an application authoring module 222 that programmatically query the qualifiers 202 defined by the addressable server 142 at any given time and can provide them as options for the application developers to include as targeting qualifiers in one or more applications. The ETV application server 142 further includes a campaign management/scheduling module 224, an ETAG module 226, a target qualifiers set (TQS) 228, a plurality of applications 240 through 244, e.g., ETV eBIF applications, which can be delivered to the STBs, and application resources 244 through 246 corresponding to the applications 240 through 242. In some embodiments the campaign management/scheduling module 224 is configured to query the qualifiers in the set 202 defined by the addressability server 142 at any given time and can provide configuration options to the operator to target a specific application and/or a user interface (UI) corresponding to an application, to one or a group of STBs based on the qualifier set 202.

The ETAG module 226 is configured to access and deliver a target qualifier (TQS) set such as set TQS 228, applications, application resources, and application signaling, e.g., ETV EISS signaling, to the customer STB devices 122, 128. The target qualifier set 228 includes a plurality of target qualifiers generated by the application authoring module 222 based on the accessed AQS 202. The TQS 228 includes a subset of the qualifiers/attributes defined in the AQS 202 and can be used to send targeted applications and/or application resources, e.g., user interface, to one or more STBs in accordance with one feature of some embodiments of the invention. In some embodiments the TQS data is generated in eBIF data resource format.

In some embodiments, specific targeted ETV eBIF application may be associated with a set of targeting qualifiers. In some embodiments such a targeted application or application resources, are sent to one or more targeted subscriber STBs when a matching criteria set forth in the application's matching logic is satisfied, e.g., when the associated target qualifiers match the addressable qualifiers for the STBs in accordance with the matching logic. The application resources 224 through 246 include EBIF application resources including an initial page resource and additional data/image resources corresponding to applications 240 through 242. In some embodiments the page resources include the UI layout and the application logic while the image resource can carry, e.g., PNG/JPEG images.

In some embodiments the ETV application server 144 generates and provides eBIF application resource data corresponding to ETV eBIF applications through ETV PIDs included in a program stream. In some embodiments the application and/or application resource data is multiplexed to a content program stream through a transport multiplexer.

Figure 3:
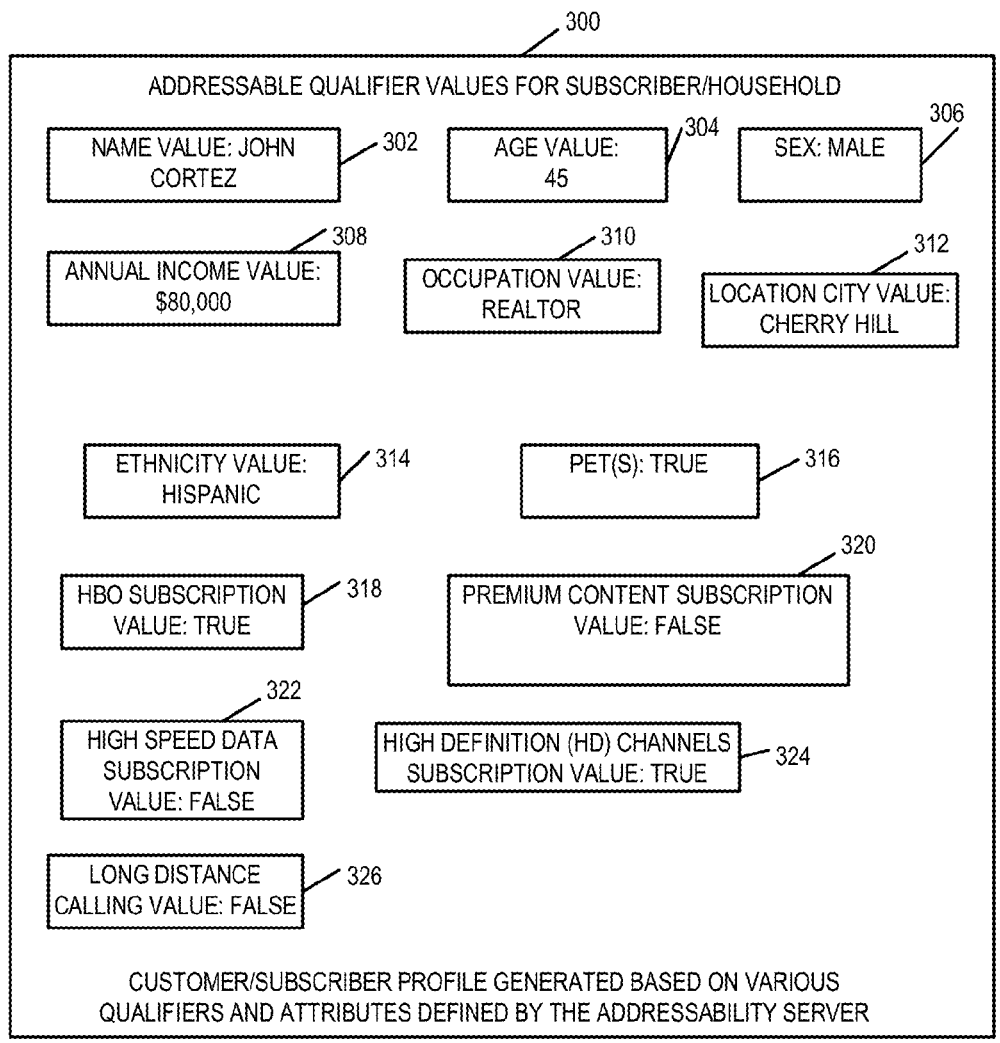
FIG. 3 illustrates an exemplary customer/subscriber profile corresponding to an exemplary customer and/or household and, in some but not all embodiments, an organization, e.g. company such as a service provider.

FIG. 3 illustrates an exemplary customer/subscriber profile 300 corresponding to an exemplary household including a single individual. The subscriber profile is associated with a subscriber's set top box, e.g., STB 122, in accordance with some embodiments. STB 122 is located at the household to which the subscriber profile 300 corresponds. Additional STBs at the household are loaded with the same subscriber profile in some embodiments. In various embodiments the exemplary customer profile 300, also referred to herein as a subscriber or household profile, is generated by the addressability server 142 based on a set of addressability qualifiers, e.g., attributes, defined by the addressability server 142 at a given time, and subscriber information provided to/imported by the addressability server 142. In accordance with one aspect, the generated subscriber profile 300 is sent, e.g., unicast, to the corresponding subscriber STB device and is stored therein. In various embodiments the subscriber's profile 300 is periodically updated, e.g., through signaling exchange between the addressability server 142 that generated and provided the customer profile 300, and the subscriber's STB 122 where the profile 300 is stored.

As the subscriber profile 300 is generated based on the addressability qualifiers/attributes and the subscriber's information, the subscriber profile 300 includes details, e.g., addressable qualifier values, corresponding to the defined addressable qualifiers discussed with regard to FIG. 2. For example, if at a given time an addressable qualifier set (AQS) includes the following qualifiers/attributes defined by the addressability server 142, such as Subscriber Name, Age, Sex, Location, Annual Income, Occupation, location, e.g., city, Ethnicity, Pets, HBO subscription, on-demand channels subscription, high speed data subscription, HD channels subscription, long distance calling subscription, etc., then the generated subscriber's profile 300 would include qualifier values corresponding to each of the qualifiers for the particular subscriber to whom the profile 300 corresponds.

The exemplary subscriber profile 300 includes qualifier values corresponding to each of the addressable qualifiers for the particular subscriber, e.g., user of STB 122. For illustration purposes, the subscriber profile 300 indicates a field showing a given addressable qualifier followed by a colon ":" followed by the qualifier value. FIG. 3 illustrates that the subscriber profile 300 includes a field 302 showing Name value as John Cortez, a field 304 showing Age value as 45 years, a field 306 showing Sex value showing the gender as a male, a field 308 showing annual income value of the subscriber as $80,000, a field 310 showing subscriber's occupation value as a real estate realtor, a field 312 showing the location value where subscriber/STB 122 is located, e.g., a city, as Cherry Hill, a field 314 showing subscriber's ethnicity value as Hispanic.

The subscriber profile 300 further includes a field 316 showing Pet(s) value as being true which indicates that the subscriber household has pets, e.g., a cat, dog, birds etc. If the Pet(s) value field indicated the value as false, that would indicate that the subscriber household does not have pets. The subscriber profile 300 further includes fields 318 through 326 which indicate values corresponding to addressable qualifier relating subscribed services, indicating various services subscribed or not subscribed by the subscriber of STB 122. For example, an addressable qualifier value in the profile 300 shown as "TRUE" indicates that the corresponding service is subscribed, while "FALSE" indicates the service not being subscribed. Field 318 shows HBO subscription value as being true which indicates that the subscriber/STB 122 has HBO subscription. Field 320 shows premium content channels subscription value as being false which indicates that the subscriber/STB 122 does not have subscription for one or more premium content channels. The profile 300 may also include details regarding the various channels/services subscribed by the customer.

Field 322 shows high speed data subscription value as being false which indicates that the subscriber does not have high speed data services subscribed. Field 324 shows high definition (HD) channel subscription value as being true which indicates that HD channels are subscribed and field 326 shows long distance calling (a telephone service feature) subscription value as being false which indicates that the subscriber does not have subscription for long distance, e.g., international calling.

Various other types of information fields may be included in a customer's profile based on the addressable qualifiers defined by the addressability server 142. The customer/subscriber's information may be gathered by the headend 102, e.g., via the subscriber's STB device, e.g., using customer's input through STB device, where the subscriber is encouraged to build a subscriber profile, e.g., using an interactive application on the STB. In some embodiments, at least some customer information is available to the addressability server 142 for use in generating the subscriber profile 300 through customer subscription records which may be generated and maintained by the service provider headend 102 based on information provided by the customer at the time of service subscription, or the customer may be asked to fill out such record form at the time of subscription. For purposes of generating the subscriber profile 300, the addressability server 142 may also obtain customer information from the customer database 148.

Various other information fields indicating addressable qualifier values that indicate subscriber's preferences, viewing habits, internet surfing habits, favorite movies/shows etc., may and in some embodiments are, included in the generated profile 300. Such information fields can also be used to target specific applications and/or advertisement campaigns to the subscriber.

In some embodiments, the exemplary subscriber profile 300 includes a set of addressable qualifier values sometimes referred to as an addressable qualifier set (AQS) 202. The subscriber profile 300 is downloaded onto the STB 122 from the addressability server 142. While a single AQS 202 corresponding to a subscriber is shown, different AQSs corresponding to the same subscriber but different organizations, e.g., companies, networks and/or service providers, may and in some embodiments are, downloaded and stored on the STB 122. Subscriber profiles corresponding to a subscriber but to different organizations may include different information, e.g., different subscription information and/or even different income or age information depending on the information the subscriber provided to the organization to which the subscriber profile corresponds. For example a subscriber profile relating to a dating service or social networking service may include different age information corresponding to a subscriber than a subscriber profile relating to a telephone or cable service due to the subscriber having provided different information to the different organizations.

The exemplary AQS 202 includes a plurality of addressable qualifier values for the subscriber to which AQS 202 corresponds where the addressable qualifier values correspond to addressable qualifiers specified by the addressability server 142 as discussed above. That is, the addressability server 142 defines what addressable qualifiers are to be included in subscriber profiles and then the parameter values corresponding to the addressable qualifiers are included in the individual subscriber profiles where the values may vary from subscriber to subscriber. For example, a male subscriber may have an "M" value for a sex addressable qualifier in his profile while a female subscriber may have an "F" addressable qualifier value for the value of the sex addressable qualifier in her profile. In a subscriber profile an addressable qualifier value may be preceded by an addressable qualifier type indicator such as SEX before the value "M", or the addressable qualifier fields in a profile may have a predetermined mapping to addressable qualifier fields so that the value in a particular filed of the profile is known to convey a particular type of information, e.g., the third field of a profile may be dedicated to storing the SEX addressable qualifier value.

In some other embodiments, the AQS 202 is not included in the profile 300, rather it is stored separately in the STB 122 memory.

In accordance with one feature, when a target qualifier set (TQS) is delivered to a subscriber's STB, e.g., STB 122, to which the subscriber profile 300 corresponds, the user agent module on the STB device compares the target qualifier values included in the received TQS with the corresponding addressable qualifier values in the subscriber profile 300 according to a specified matching logic which is used to specific conditions or constraints which are based on the comparison between values in the TQS and the subscriber profile. For example, the conditional logic may specify a match (=) constraint, greater than (>) constraint or a less than constraint. Individual constraints may be combined based on specified logical operates specifying operations such as AND or OR. Thus, a combination of constraints can be specified based on one or more target qualifier values with the combination of constraints having to be satisfied before a corresponding application portion, which may be a sub-element application portion an entire complete application, is executed.

Based on the result of matching, different applications and/or application resources, e.g., UI's (User Interfaces), product images etc., can be launched on the subscriber's STB and shown to the customer. Thus it should be appreciated that using the features of various embodiments of the present invention, specific targeted applications, advertisements and/or information etc., which are intended for a one or more target subscribers, can be presented to the intended recipients.

A target application may refer to different variables and/or data elements corresponding to the application and the ones available to a user agent on a STB device, e.g., those which are stored on the STB. Some of the references that an application can use include Environment Property references that provides access to variables on the platform, and User Preference Item property references that allow the application to query/manage user preferences on the STB. In accordance with one aspect of some embodiments of the present invention, addressability within an application, e.g., EBIF application, is implemented by using a provision to extend exemplary EBIF User Preference items and Environment properties as a way of accessing the addressable qualifiers and other attributes from EBIF application. Thus in some embodiments, exemplary user preference items and environment properties are specified that allow a target application to access and manage the qualifiers/attributes specific to a subscriber as specified in the subscriber profile, e.g., customer profile 300, on the STB device, and the target qualifier values received by and/or included in an application.

Figure 12:
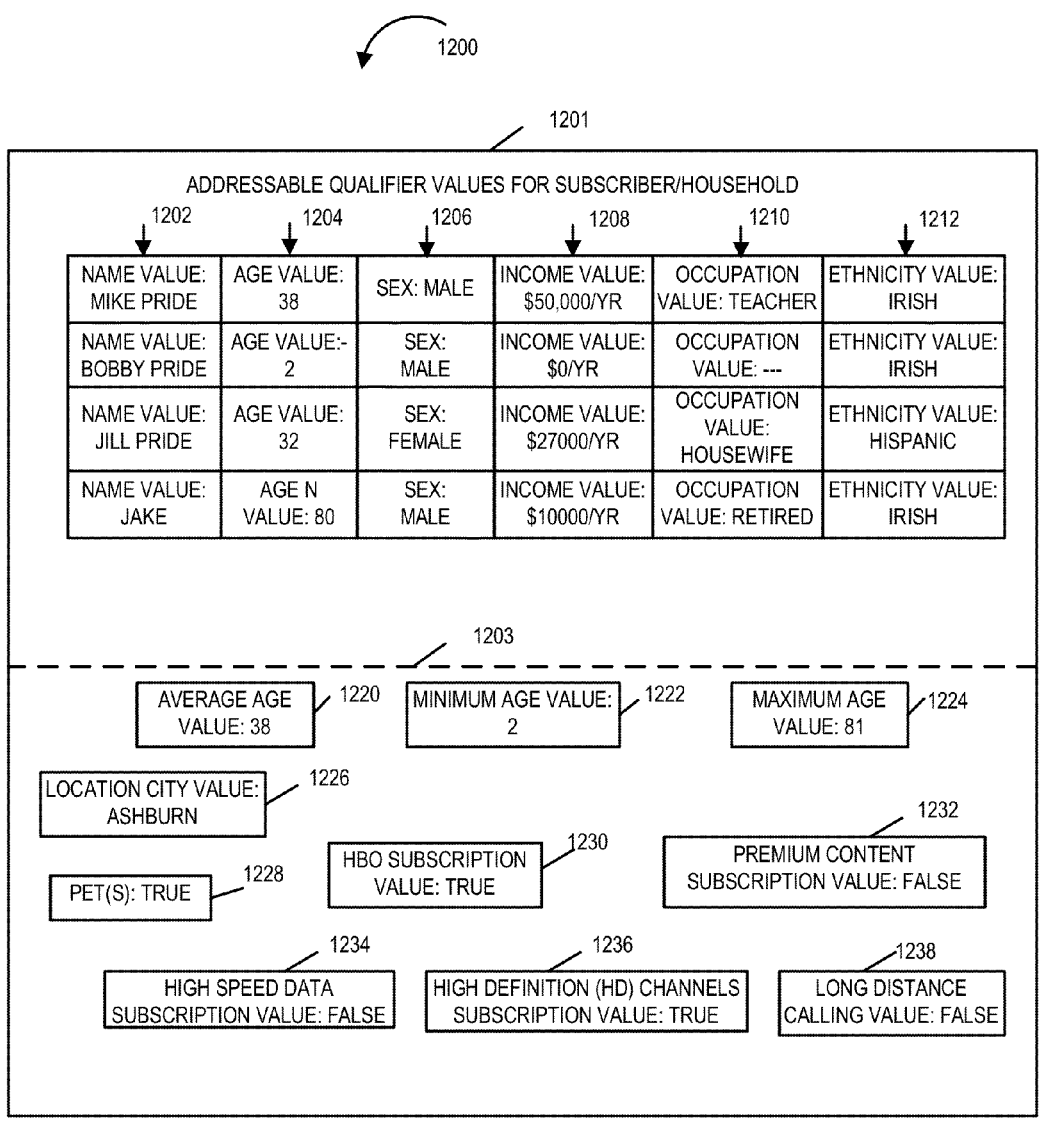
FIG. 12 illustrates an exemplary customer/subscriber profile corresponding to a household including multiple individuals of different ages.

Referring now briefly to FIG. 12 another exemplary set of addressable qualifier values 1200 is shown for another household, e.g., a household including multiple members unlike the household to which set 300 corresponds. Addressable qualifier set 1200 maybe loaded onto a STB e.g., STB 128 at customer premise N.

The exemplary set of addressable qualifier values 1200 includes information 1201 corresponding to individual customers located at the household to which the set 1200 corresponds as well as addressable qualifiers 1203 which are applicable to the household as a whole. The information 1201 corresponding to the individual members includes a row corresponding to each of the individual members of the household to which set 1200 corresponds with each column 1202, 1204, 1206, 1208, 1210, 1212 providing different information. For example, column 1202 includes name information, column 1204 includes age information, column 1206 include sex information, column 1208 includes income information, column 1210 includes occupation information and column 1212 includes ethnicity information. Note that the members of the household vary in age, sex, occupation and, at least in one member of the household, ethnicity. The STB may not be able to determine which viewer is watching at a particular point in time and/or may not include the full set of information for the various members of the household. In some such cases the information included in portion 1203 may be used, e.g., average age value 1220, minimum age value 1222 and maximum age value 124, for targeting purposes. However, in some embodiments the STB determines which household member's information should be used at a particular time for determining if targeting constraints are satisfied by selecting the information corresponding to the household member most likely to be using/viewing the output of the STB at a particular point in time based on the content being output and/or the time of day. Information about the content being viewed, e.g., the type of program being viewed such as cartoon, soap opera, news, history, adult content and/or the programs rating is used by the set top box in some embodiments to make a determination as to which of the household members is the likely viewer. For example, if a cartoon is being viewed, the STB may select the information corresponding to the youngest member of the household as the constraint information to be used while the cartoon is being viewed. If the content being viewed is history or content which is more than 20 years old as indicated by program date information, the STB may, and in some embodiments does, select the addressable qualifiers corresponding to the oldest user, e.g., the qualifier values in the fourth row of portion 1201 to determine if one or more constraints have been satisfied. The time of day may, and in some embodiments is used, alone or in combination to select the information corresponding to one of the users to use in determining if a constraint is satisfied. For example, the information corresponding to a middle aged user, e.g, the information in the first or third row of portion 1201 may be selected if content is being output by the STB between 8 pm and midnight. In view of the above discussion it should be appreciated that the STB may, and in some embodiments does select, the information corresponding to one of the household members to use to determine, at a particular point in time, if advertising and/or other targeting constraints are satisfied with which particular set of user information is used being selected based on the time of day and/or the content being output by the STB. The more general household parameters 1220, 122, 1224, 1226, 1228, 1230, 1232, 1234, 1236, 1238 remain applicable at all time of day and are not specific to a particular user so the STB can use these parameters without concern over which of the users may be using the STB at a particular point in time.

As should be appreciated the set 1201 of information corresponding to individual household members may be, and in some embodiments is, omitted from the set 1200. In at least some such embodiments the set 1200 includes the addressable qualifiers in portion 1203 but not those in portion 1201. Alternatively a combination of qualifiers in portions 1201 and 1203 may be included or the values of a single household member may be used in place of the average age 1220, minimum age 1222 and maximum age value 1224. It should be appreciated that while values 1220, 1222 and 1224 are not shown in the FIG. 3 embodiment they may be included expressly in the set 300 or derived as needed from the information included in the addressable qualifier set 300. The derivation of such values is straight forward given that the set 300 corresponds to a single individual making the average age equal to the age 304 of the individual and the minimum and maximum age values also equal to the age value 304 of the individual.

As discussed above it should be appreciated that depending on the embodiment the addressable qualifiers for individual household members may be omitted and/or the information for a single household member could be used rather than the general household information. In some embodiments where set top boxes are loaded with addressable qualifier set 1200. While various examples are explained in the context of an example which uses the set 300, it should be appreciated that the set of value 1200 could be used instead of the set 300 with the set that is used being dependent on the household and number of individuals at a given household to which the STB implementing the method corresponds.

Using the features of some such embodiments, at runtime the application can access the addressable values corresponding to various targeting qualifiers/attributes and present the interactive UI corresponding to a set of targeting qualifier values and constraints that are satisfied by the addressable qualifier values included in an individual subscriber's profile. Thus, UI and marketing applications, e.g., product advertisements, can be targeted and presented to specific subscribers based on the information included in the subscriber's profiles stored on their STBs.

Using the features implemented in some embodiments of the present invention, the service provider can control and can devise different application behavior and present different UI screens based on the target group of subscribers.

FIG. 4 illustrates an exemplary application 400, e.g., an ETV application, which is communicated to STBs in accordance with some embodiments. The application 400 includes an application identifier 402 which identifies the application and application code 404 which is to be executed when a STB runs the application 400 regardless of the content of the subscriber profile stored on the STB. The application includes a plurality of application portions, e.g., segments or modules, shown in column 412 with each row of column 412 showing a different application portion. The first row of column 14 corresponds to a first ad campaign application portion which may be implemented as a first user interface application portion. The second row of column 412 corresponds to a second ad campaign application portion which may be implemented as a second user interface application portion. The third row of column 412 corresponds to a third ad campaign application portion which may be implemented as a third user interface application portion.

Columns 406 and 408 include a target qualifier sets and logic operations in row 406, 408 respectively. Each row includes the target qualifier set and conditional logic which must be satisfied if the application portion included in column 412 of the same row is to be executed. While shown as separate columns 406, 408 it should be appreciated that the information shown in columns 406 and 408 for a given row will normally be communicated together as part of a string or other expression which includes both target qualifier values and combination logic in a manner that sets forth a logical constraint that must be satisfied for the corresponding program portion to be executed. Thus, constraints expressed by the combination of target qualifier set 1 and logic operation set 1 must be satisfied for the executable ad campaign program portion corresponding to user interface 1 to be executed.

The target qualifier set includes target qualifier values corresponding to addressable qualifiers of interest with regard to an entity seeking to promote ad campaign/user interface 1.

Exemplary application 400 is used in some embodiments where addressability at application level is implemented, e.g., where different portions of an application may be executed depending on which combination of target qualifier values and constraints are satisfied by the addressable qualifier values in the subscriber profile stored on the STB that receives and implements application 400. In at least some embodiments of the type illustrated in FIG. 4, the TQS set and constraint information is delivered along with the application data/executable application portions. However, it should be appreciated that rather than include the actual executable application portions such as shown in column 412, the executable portions can be identified by identification information such as that shown in column 410 with the corresponding program portion being retrieved and/or executed in response to the corresponding target qualifier set and conditions being satisfied by the information included in the subscriber profile stored on the STB.

The STB receiving the application 400 processes the targeting information included in the application, e.g., the targeting information included in columns 406 and 407 and performs a matching operation, according to the specified conditional application logic. As part of the process, the target qualifier values included in the target qualifier set shown in each row is compared to the corresponding values included in the subscriber profile 300 If the constraints corresponding to an application portion are satisfied, the STB executes the corresponding program portion, e.g., presents a specific user interface from a plurality of user interfaces thereby targeting the application 400 to the user and/or implementing an ad campaign having targeting criteria which are satisfied by the user information stored in the subscriber profile on the STB.

In accordance with one aspect of some other embodiments, addressability at a signaling level is achieved allowing an application to receive application elements, e.g., application information, and/or executable application code, in a stream along with application portion targeting information. The combination of application elements and/or application portions and conditional logic is referred to herein as a set of program information.

FIG. 5 illustrates a set of exemplary application information which can be received and processed by an application or module, e.g., a User Agent application or module or another application being executed on a STB. The set of program information 500 includes a target qualifier set 502, e.g., a set of target qualifier values to be compared to corresponding addressable qualifier values in a subscriber profile, logic operation information 504 setting forth logical operations and/or constraints to be satisfied given the parameters, e.g., targeting qualifier values, included in element 502. In addition, to elements 502 and 506 the set of application information 500 may and sometimes does include an application identifier 506 which identifies which one of a plurality of applications on the STB is check the target qualifier set and logic constraints specified and retrieve or execute the corresponding application portion when the constraints for execution of the corresponding application portion are satisfied, e.g., based on a check of the subscriber profile stored on a STB receiving the set of application information 500. The set of information normally includes one of elements 508 or 510 but may include both. Element 508 is an application portion identifier which identifies a portion of an application to be executed when the constraints specified by elements 502 and 504 are satisfied. The STB receiving and processing information set 500 may use the information in element 508 to retrieve, e.g., download, the identified application portion. The identified application portion may be a complete application to be executed or a portion of an application to be executed, e.g., by the application identified by optional element 506. As an alternative to including the identifier in element 508, or in addition to the identifier included in element 508, the set of application information 500 may include the application portion 510, e.g. page resource content and/or executable code, thereby eliminating the need for the STB to retrieve the application portion corresponding to the information set 500 since, at least in the particular embodiment in which optional element 510 is included, the application portion is included in the set of application information 500.

FIGS. 6A, 6B, 6C illustrate how application information sets 600, 650, 680 can be used to control the presentation of different user interfaces as part of first, second and third ad campaigns which are the same as or similar to those to which the first, second and third rows of the FIG. 4 embodiment correspond. Note how the application information set 600 of FIG. 6A communicates the same or similar information to that previously described with regard to row 1 of the FIG. 4 embodiment. Note also how the application information sets 650, 680 of FIGS. 6B and 6C communicate the same or similar information to that previously described with regard to rows 2 and 3 of the FIG. 4 embodiment.

Significantly, in the FIG. 6A-6C embodiments, a set top box need not load each of the three application portions 1, 2 and 3 but only the one which is relevant and to be executed by the STB which process the application information sets 600, 650, 680.

In the FIGS. 6A, 6B, 6C examples, columns 602, 652, 682 communicate information of the type described with regard to column 502 of FIG. 5. Columns 604, 654, 684 communicate information of the type described with regard to column 504 of FIG. 5. Similarly columns 606, 656, 686 communicate information of the type described with regard to column 506 while columns 608, 658 and 688 communicate information of the type described with regard to column 506 of FIG. 5. Application program portions are included in each of options elements 610, 660, 690 in the FIG. 6 embodiment, e.g., with Application portion 610 corresponding to a first ad campaign and/or user interface, application portion 660 corresponding to the second ad campaign and/or user interface and application portion 690 corresponding to a third ad campaign and/or user interface. Application portions 610, 660, 690 may be independent and fully executable applications or application portions which are executed by another application, e.g., an EBIF user agent or other module running on the STB which receives the program information sets 600, 650, 680.

In accordance with one aspect of some other embodiments, addressability at signaling level is achieved by using privately defined application meta-data item descriptors, in addition to the regular descriptors that are carried over in an EISS PID in an MPEG-2 transport program stream. In some such embodiments, a method to support addressability through signaling is implemented that uses the private meta-data descriptors in signaling. Thus in some embodiments an exemplary specific descriptor is defined that carries a string payload in a well defined syntax that can constitute a predicate logic for specifying the targeting profile.

The user agent module in a STB device processes the signaling along with the targeting meta-data and can decide which initial page resource corresponding to an application should be presented to the subscriber/viewer based on the criteria match with the target profile on the set top box. In some embodiments, if there is no match the user agent can resolve to the default resource in the signaling and present the default UI and/or image corresponding to the application.

The advantage of this option is that the target group for the application can be specified independent of application authoring and can be specified dynamically by the campaign manager and/or by the application scheduling system. Also, this dynamic approach gives the flexibility to postpone the targeting decision until just right before the moment when the application is going to playout, e.g., be executed.

Figure 7:
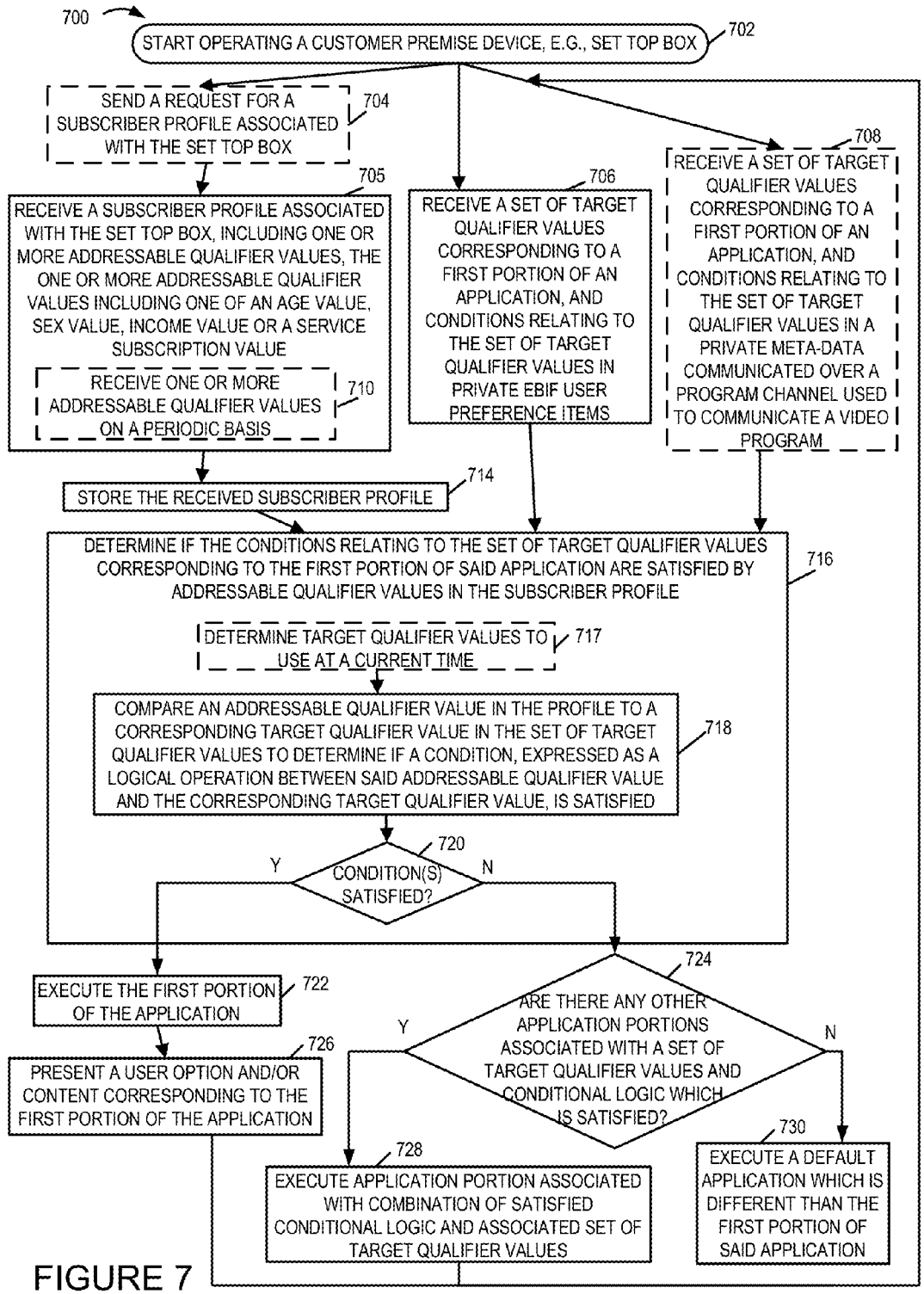
FIG. 7 is a flowchart illustrating the steps of an exemplary method performed in accordance with some embodiments of the invention.

FIG. 7 is a flowchart 700 illustrating the steps of an exemplary method performed by a customer premise device, e.g., set top box 122, in accordance with some embodiments of the invention. For discussion purposes, consider that the STB 122 is used to implement the method of flowchart 700.

The method starts in step 702 with the set top box being placed into operation at a customer premise. Operation proceeds from start step 702 to steps 704, 706, and 708 which are performed asynchronously in parallel in some embodiments.

Step 704 shown using a dashed line box is optional and is performed in some embodiments but not necessarily in all embodiments. Step 708 which is also shown using a dashed line box is optional and is performed as an alternative to step 706 in some embodiments. However in some embodiments, both steps 706 and 708 are performed to receive target qualifier values and conditional logic corresponding to an application and/or application portion.

In step 704 a request for a subscriber profile associated with the STB 122 is sent, e.g., to the addressability server 142 or another server in the headend 102. In response to the request, the addressability server 142 sends the subscriber profile, e.g., profile 300, including one or more addressable qualifier values to the STB 122. When step 704 is skipped, operation proceeds from step 702 to steps 705, in addition to proceeding to steps 706 and 708 which correspond to parallel processing paths. Processing and the receipt of data, applications and/or application data, may occur in a asynchronous manner with different data being received at different times. Accordingly it should be appreciated that while some processing paths are shown in parallel, the operations from a time perspective may occur in a sequential manner or in parallel depending on when data is received.

In step 705 the STB 122 receives a subscriber profile associated with the STB 122, e.g., subscriber profile 300, including one or more addressable qualifier (AQ) values, the one or more addressable qualifier values including at least one of an age value, sex value, income value, or a service subscription value. In some embodiments, step 705 includes performing step 710. In step 710 the STB receives one or more addressable qualifier (AQ) values on a periodic basis, e.g., step 710 is performed periodically. The periodically received AQ values may be new values corresponding the same or new addressable qualifiers specified by the addressability server 142. In some embodiments, an updated subscriber profile is received periodically from the addressability server 142. Operation proceeds from step 705 to step 714 wherein the received subscriber profile is stored on the STB 122. Operation proceeds from step 714 to step 716.

Referring to steps 706 and 708. Steps 706 and 708 show two different approaches used in the present invention for communicating target qualifier (TQ) values corresponding to an application or an application element, and conditional logic relating to the TQ values. In some embodiments step 706 is performed wherein the TQ values and conditional logic are received with the application. In step 706 the STB receives a set of target qualifier (TQ) values corresponding to a first portion of an application and conditions, e.g., conditional logic, relating to the set of target qualifier values in private EBIF user preference items. In some such embodiments the application is communicated along with applications elements, targeting qualifier values and conditional logic to be applied to match the TQ values to the AQ values stored in the subscriber profile in the STB. In some embodiments the private EBIF user preference items include at least one private user preference item name which is prefixed with an "x-" or "X-". Operation proceeds from step 706 to step 716. In some embodiments the application is an EBIF application and the first portion of the application is one of a plurality of different user interface portions of said EBIF application. In some embodiments the first portion of said application is the entire EBIF application.

Referring now to step 708 which is performed in some embodiments. Step 708 illustrates an approach where TQ values corresponding to an application or an application element, and the conditional logic relating to the TQ values are received via application signaling but not with the entire application. The corresponding application or application element may be downloaded when a matching criteria between the received TQ values and the AQ values in the subscriber profile 300 is satisfied in accordance with the conditional logic relating to the received TQ values. In step 708 the STB receives a set of target qualifier (TQ) values corresponding to a first portion of an application and conditions, e.g., conditional logic, relating to the set of target qualifier values in private metadata communicated over a program channel used to communicate a multimedia program. In some such embodiments the private metadata is MPEG compliant private metadata. In some such embodiments said application is an EBIF application and the first portion of the application is a first user interface portion of said application. In some embodiments the first user interface portion is one of a plurality of different user interface portions executable by a User Agent on the set top box depending on whether the conditional logic relating to the received TQ values corresponding to the first portion of the application are satisfied by the corresponding AQ values in the subscriber profile on the STB. Operation proceeds from step 708 to step 716.

Returning now to step 716. In accordance with one feature of the invention, in step 716 a user agent on the STB performs an operation to determine if conditions, e.g., conditional logical operations relating to the set of TQ values corresponding to the first portion of the application, e.g., user interface/initial page resource, are satisfied by the one or more addressable qualifier values in the subscriber profile, e.g., subscriber profile 300 or 1200 depending on the STB implementing the method.

As discussed above in some embodiments the subscriber profile used in the STB corresponds to a single individual such as in the case of the FIG. 3 example or multiple users such as in the case of the FIG. 12 example where the household to which the STB implementing the method includes multiple, e.g., 4, individual members for which individual information is available.

Option step 717 s used in at least some embodiments to determine which qualifier values are to be used. Step 717 may include selecting the target qualifier values corresponding to one of a plurality of household members to use at the point in time step 717 is being implemented. The selection of which household member's target qualifier values is made, in some embodiments, based on the content being viewed and/or the time of day. For example, viewing and/or outputting of cartoons would result in the qualifier values corresponding to the youngest household member being selected for use while watching of old programs or history programs would result in the oldest household member's target qualifier values being used. The qualifier values applicable to the household in general, e.g. those in portion 1203 of the set 1200 would also be selected for use in step 717. Note that 717 is normally skipped when there is information for only a single household member in the set of information 300 or 1200 since there is no uncertainty as to which set of value should be used in such a case.

In various embodiments the step 716 of determining includes performing a comparison operation shown in step 718 and making a decision based on the comparison illustrated in step 720. In step 718 the STB compares an addressable qualifier value in said subscriber profile to a corresponding target qualifier value in the set of target qualifier values (received in step 706 or 708) to determine if a condition, expressed as a logical operation between said addressable qualifier value in the subscriber profile and the corresponding target qualifier value, is satisfied. For example, the conditional logic may require the STB to compare an addressable qualifier value, e.g., "income value" stored in the subscriber profile 300 to a specified corresponding target qualifier value, e.g., $50,000, to determine if a specified condition, e.g., less than, equal to, greater than, is satisfied. The condition may be a logical operator such as discussed above.

Next in step 720, a decision is made regarding an action to be performed as part of the determination step, based on the result of comparison and the operation proceeds according to the decision. Thus if the condition(s) are satisfied the operation proceeds from step 720 to step 722 otherwise the operation proceeds to step 724.

In step 722, following the determination that condition(s) are satisfied, the STB executes the first portion of the application. Operation proceeds from step 722 to step 726 wherein the user agent on the STB presents a user option and/or content corresponding to the first portion of the application, e.g., on a display device. The user option and/or content may be an advertisement audio-video clip, text message, an image etc.

Operation continues over time as represented by the loop back to the beginning of processing.

Returning to the discussion of step 724. In step 724 the STB checks if there are any additional set of target qualifier values corresponding to additional application portions and associated conditional logic which is satisfied by the addressable qualifier (AQ) values in the profile. It should be appreciated that the STB may receive additional set of target qualifier (TQ) values corresponding to other applications or application portions along with conditional logic to apply for comparing the TQ values to AQ values. Step 724 is performed to check if there are any other application portions associated with a set of TQ values and conditional logic which is satisfied. If it is determined in step 724 that there is another such application portion associated with a set of TQ values and conditional logic which is satisfied, the operation proceeds from step 724 to step 728 otherwise the operation proceeds to step 730.

In step 728 the STB executes the application portion associated with a combination of satisfied conditional logic and associated set of TQ values, that is, the STB executes the application portion for which the associated conditional logic relating to the TQ values is satisfied by the AQ values in the subscriber profile. Operation proceeds from step 728 back to the beginning of processing and may continue as indicated by the loopback.

In step 730 the STB executes a default application following the determination in step 724 that there is no other application portion associated with a set of TQ values and conditional logic which is satisfied. Operation proceeds from step 730 back to the beginning of processing with the loop representing that processing in the STB continues on an ongoing basis.

Figure 8:
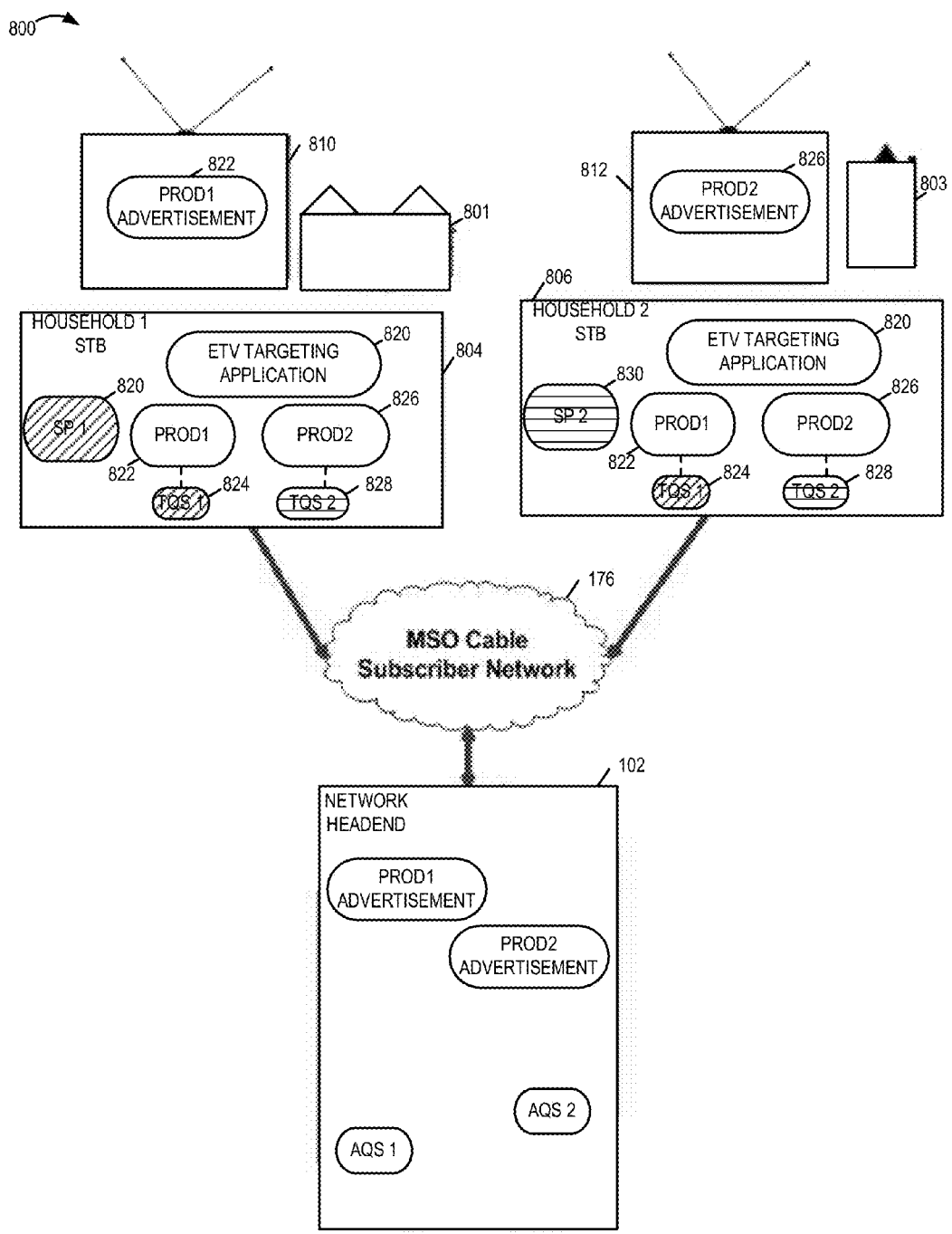
FIG. 8 is a drawing 800 showing an example in which different content, e.g., different product advertisements, are presented to two different subscribers depending on the different target qualifier values and conditional logic being satisfied by addressable qualifier values included in the subscriber profiles stored in different STBs where the STBs correspond to the two different subscribers.

FIG. 8 is a drawing 800 showing an example in which different content, e.g., different product advertisements, are presented to two different subscribers depending on the different target qualifier values and conditional logic being satisfied by addressable qualifier values included in the subscriber profiles stored in different STBs where the STBs correspond to the two different subscribers.

Drawing 800 illustrates that STBs corresponding to two different household, e.g., household 1 STB 804 corresponding to household 1 801 and household 2 STB 806 corresponding to household 2 803, have different corresponding subscriber profiles (SP) SP1 820 and 830 stored on them respectively. Both STBs 804 and 806 have received the same ETV application 820 and two target qualifier sets TQS1 824 and TQS2 828 including target qualifier values. TQS1 824 corresponds to a first portion of the ETV application 828 which when executed displays an advertisement for a product PROD1 822. TQS2 826 corresponds to a second portion of the ETV application 828 which when executed displays an advertisement for a product PROD2 826. In the example, it is illustrated that the household 1 STB 804 determines that the conditional logic relating to the TQS1 824 is satisfied by the addressable qualifier values in SP1 820. Accordingly the STB 804 executes the first portion of the ETV application 828 and presents the advertisement for product PROD1 822 on the display device 810 as should be appreciated from the figure.

On the other hand, the household 2 STB 806 determines that the conditional logic relating to the TQS2 828 is satisfied by the addressable qualifier values in SP 2 830. Accordingly the household 2 STB 806 executes the second portion of the ETV application 828 and presents the advertisement for product PROD2 826 on the display device 812 as shown.

Figure 9:
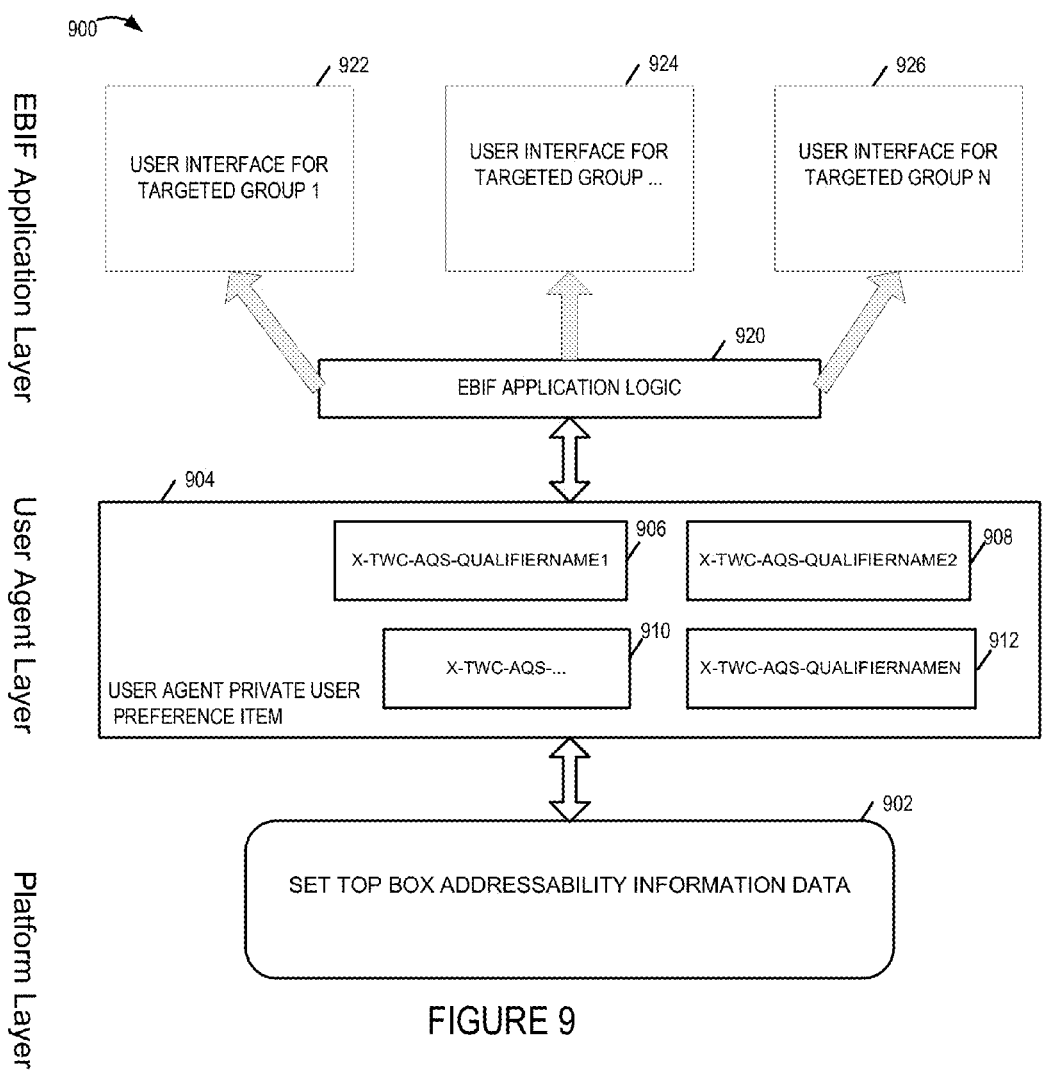
FIG. 9 is a block diagram 900 showing exemplary operation of a STB implementing application level addressability.

In various embodiments addressability at an application level is supported and used. FIG. 9 is a block diagram 900 showing exemplary operation of a STB implementing application level addressability.

In FIG. 9, element 902 represents the receipt of set top box addressability information data, e.g., subscriber profile information, which is stored on the STB. Box 904 represents user agent operation on the STB. The STB uses targeting information 906, 908, 910, 912 included in a Private User Preference Item 904 to determine which user interface 922, 924, 926 to present to a user of the STB based on addressable qualifier values included in the subscriber profile stored on the STB. The EBIF application logic 920 running on the STB boxes compares subscriber profile information to target qualifiers and determines which of the user interfaces 922, 924, 926 should be presented by the STB based on matching results.

In FIG. 9, the STB uses addressability at an application level and presents different application behavior and/or presents different visual sub-elements for different target groups. In this scenario multiple STBs in the system may run the same application but the behavior of the application can and often will be different based on the target group the set-top belongs to.

Figure 10:
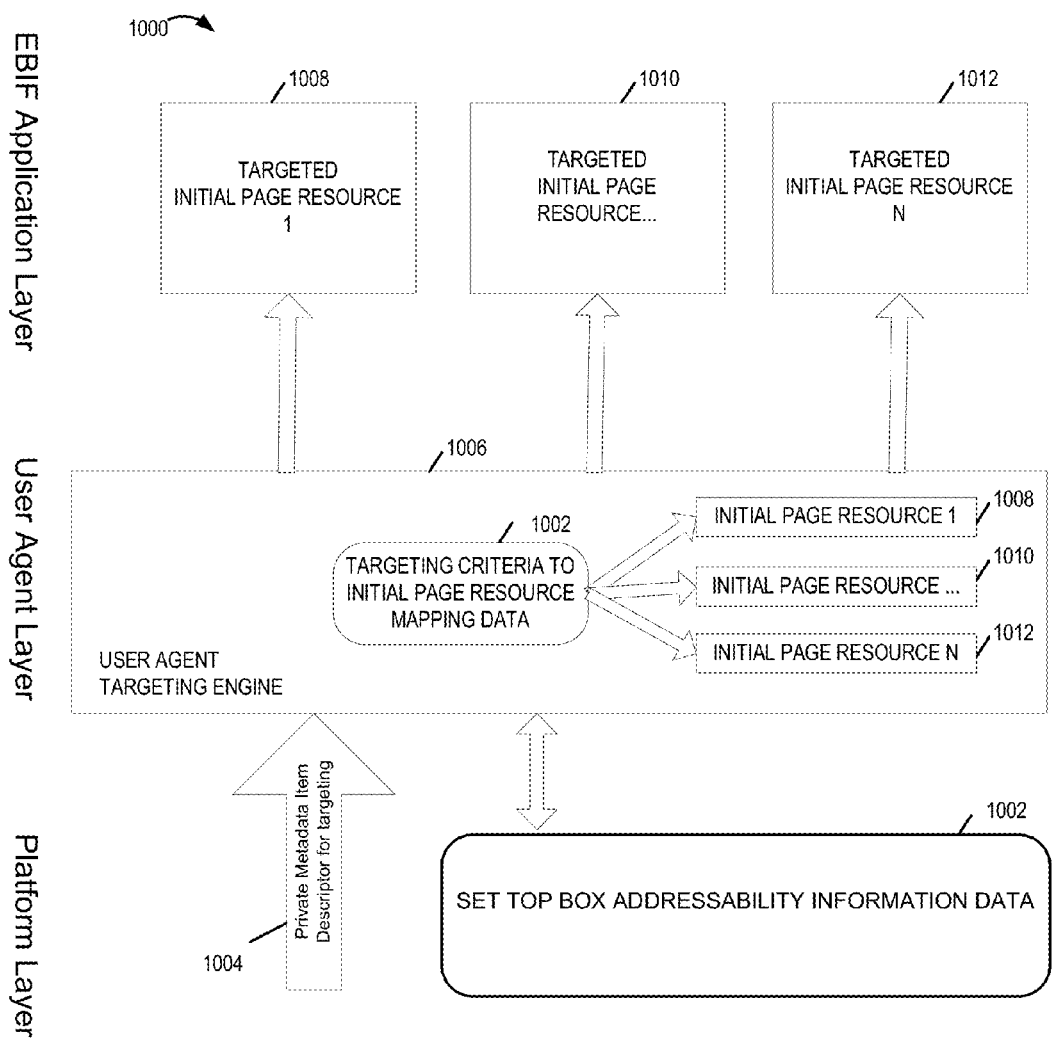
FIG. 10 is a block diagram 900 showing exemplary operation of a STB implementing addressability at a signaling level.

FIG. 10 is diagram 1000 of an example of utilizing in addressability in a STB at the signaling/platform level by which one can target a specific application or a sub-element within an application to a specific target group. In this scenario the application/sub-element is loaded on the set-top boxes that belong to the target group as specified in the signaling but not on other STBs.

In the FIG. 10 example set top box addressability information data 1002, e.g., a subscriber profile, is supplied to and stored on the STB. In addition a private metadata item descriptor 1004 used for targeting is supplied to the STB, e.g., in an MPEG stream.

The user agent processes the private metadata item 1004 comparing targeting criteria information 1002 included therein to information, e.g., addressable qualifiers in the subscriber profile information 1002 to determine which of the page resources 1008, 1010, 1012 should be loaded and executed. Assuming the targeting criteria corresponding to page resources 1008, 1010, 1012 are satisfied, they will be loaded and executed as represented by blocks 1008, 10101, 1012 shown at the top of FIG. 10. However, if some of the targeting criteria are not satisfied, the page resources whose targeting criteria are not satisfied will not be downloaded and executed, e.g., displayed. Thus, the application portions and/or application s which are downloaded and executed will vary in the FIG. 10 embodiment from STB to STB depending on the contents of the subscriber profile stored on the particular STB.

Figure 11:
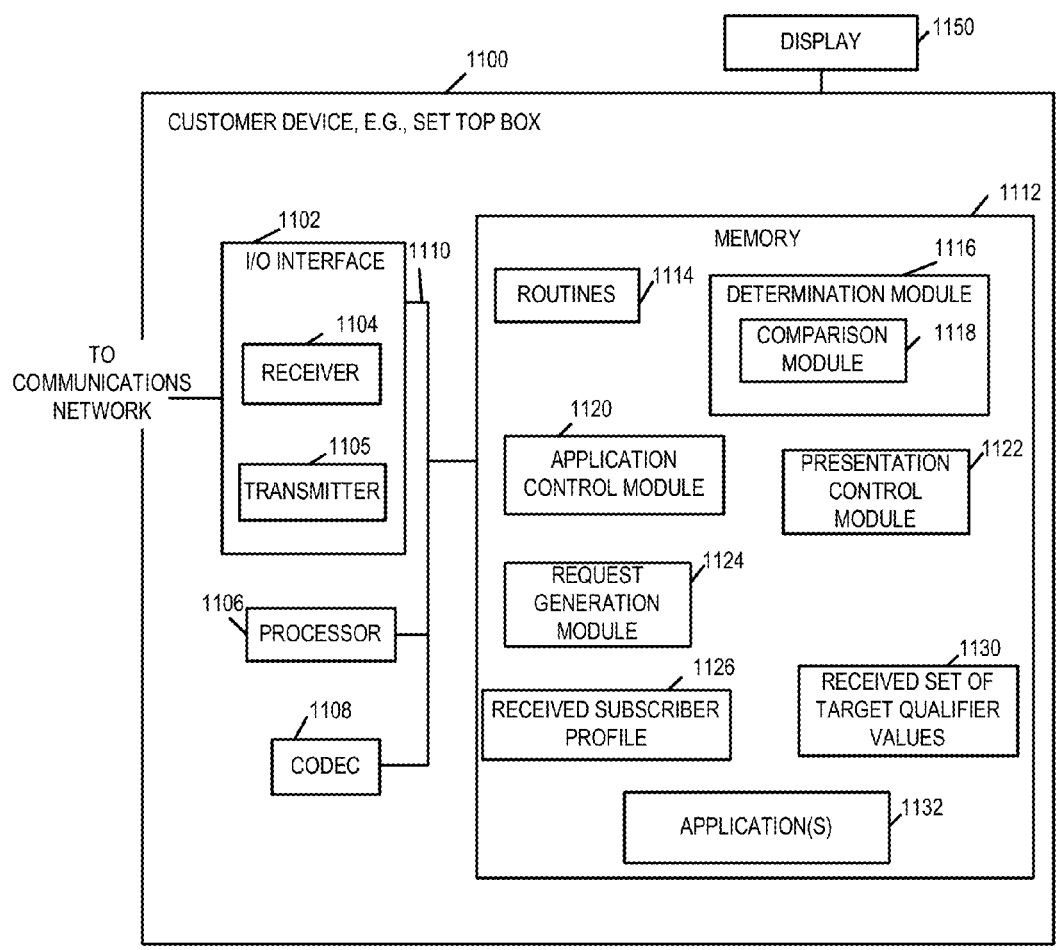
FIG. 11 illustrates an exemplary customer premise device, e.g., a set top box (STB), implemented in accordance with some embodiments of the invention.

FIG. 11 illustrates an exemplary customer premise device 1100, e.g., a set top box (STB) implemented in accordance with some embodiments of the invention. The customer device may be used as any of the STB's 122, 128 shown in FIG. 1 and/or the STBs 804, 806 sown in FIG. 8. In some embodiments the customer device 1100 implements the method of flowchart 700.

As shown, in some embodiments the customer device 1100 is coupled, e.g., via an interface 540, to a display device 1150, e.g., a television (TV), or another device for presenting program content. In some embodiments the output device 1150 is integral to the customer device 1100 or coupled as shown via a communications interface. The customer device 1100 includes various modules which are configured to perform the functions/operations corresponding to the steps illustrated in flowchart 700. Completely hardware based or completely software based modules may be used. However, it should be appreciated that any combination of software and hardware (e.g., circuit implemented) modules may be used to implement the functions. As should be appreciated, the modules used in the customer device 1100 control and/or configure the customer device 1100 or elements therein such as the processor 1106, to perform the functions of the corresponding steps illustrated and/or described in the method of flowchart 700 of FIG. 7. In some embodiments one or more modules together perform the operation corresponding to one or more steps shown in flowchart 700.

The customer device 1100 includes an Input/Output (I/O) interface 1102, a processor 1106, a codec (Coder/Decoder) 1108, and a storage device, e.g. a memory 1112 coupled together via a bus 1110. The various elements of the customer device 1100 can exchange data and information over the bus 1110. Via the I/O interface 1102, the secure device 1100 can exchange signals and/or information with other devices and/or system elements such as the servers in the network headend 102, via the communications network 176.

The I/O interface 1102 includes a receiver 1104 and a transmitter 1105 that support the receipt and/or transmission of content, and/or other information from/to different servers. In some embodiments the I/O interface 502 also includes, e.g., an infrared signal receiver to receive signals from a user remote control device. In some embodiments the I/O interface 502 includes an in-built modem which supports receiving content. In some embodiments the receiver is configured to receive a subscriber profile associated with the set top box 1100, including one or more addressable qualifier values, said one or more addressable qualifier values including at least one of an age value, sex value, income value or service subscription value. In some embodiments the receiver 502 is further configured to perform the functions discussed with regard to steps 705, 706, 708.

The processor 506, e.g., a CPU, executes routines 514 and one or more modules and controls the customer device 1100 to operate in accordance with the invention. To control the customer device 1100, the processor 1106 uses information, various modules and/or routines including instructions stored in memory 1112. The Codec 1108 is implemented as a module and is capable of performing encoding and/or decoding operations on a digital data stream or signal.

In addition to the routines 1114, the memory 1112 in some embodiments includes a determination module 1116, an application control module 1120, a presentation control module 1122, a request generation module 1124, received subscriber profile 1126, received set of target qualifier values, e.g., set of target qualifier values corresponding to a first portion of an application, and one or more applications 1132.

Routines 1114 include communications routines and/or control routines. The determination module 1116 is configured to determine if conditions relating to a set of target qualifier values corresponding to a first portion of an application are satisfied by the one or more addressable qualifier values in said subscriber profile. The determination module may include one or more sub-modules and performs the functions corresponding to step 716 discussed with regard to FIG. 7. For example, the determination module 1118 includes a comparison module 1118 configured to compare an addressable qualifier value in said subscriber profile to a corresponding target qualifier value in said set of target qualifier values to determine if a condition, expressed as a logical operation between said addressable qualifier value in the subscriber profile and the corresponding target qualifier value, is satisfied.

The application control module 1120 is configured to execute said first portion of said application when it is determined that said conditions relating to the set of target qualifier values corresponding to the first portion of said application are satisfied by said one or more addressable qualifier values in said subscriber profile. The presentation control module 1122 is configured to present a user option and/or content corresponding to the executed application or application portion, e.g., on the display device 1150. The user option and/or content may be an advertisement audio-video clip, text message, an image etc. The request generation module 1124 is configured to generate a request for the subscriber profile 1126 including said at least one addressable qualifier value and send the request to a server, e.g., via the I/O interface 1102. In some embodiments the subscriber profile 1126 including at least one addressable qualifier value is received by the customer device 110 in response to the request.

The received subscriber profile 1126 is stored in the memory 1112 and may be updated periodically in accordance with the invention. One or more sets of target qualifier values such as received set of target qualifier values 1130 may be received from time to time and are stored in the memory 1112.

Embodiments and examples relating to Addressability at Application Level in EBIF applications will now be described. CableLabs ETV-EBIF specification defines a binary format for ETV application that can consist of many EBIF resources including an initial page resource and additional data/image resources. The page resource contains the UI layout and the application logic while the image resource can carry PNG/JPEG images. The specification also defines a reference model for application to refer to different variables and data elements within the application and the ones exposed by the user agent. Environment Property reference is one of the many reference type defined in the reference table of the EBI resource that provides access to variables on the platform. Also, there is also User Preference Item property reference which allows the application to query/manage user preferences on the set-top.

For implementing addressability within an EBIF application, the novel approach to targeting of the present invention extends the EBIF User Preference items and Environment properties as a way of accessing the addressable qualifiers and other attributes from EBIF application. Using this interface, at runtime the application logic can access the values of various targeting qualifiers/attributes to determine which group the set-top/subscriber belongs to and present the interactive UI accordingly.

The advantage of this option is that the application author has control and can devise different application behavior and different UI screens based on the target group. The disadvantage of this option is that the application has to change if the target group has to change.

The ETV-EISS specification allows for privately defined application meta-data item descriptors. The technique implemented to support addressability through signaling uses this private meta-data descriptor in signaling. For this purpose, in some embodiments a novel specific descriptor is defined that carries a string payload in a well defined syntax that can constitute a predicate logic for specifying the targeting profile.

The User Agent operating on the STB processes the signaling along with this targeting meta-data and can decide which initial page resource to be presented to the viewer based on the criteria match with the target profile on the set-top. If there is no match the user agent can resolve to the default resource in signaling.

The advantage of this option is that the target group for the application can be specified independent of application authoring and can be specified dynamically by the campaign manager and/or by the application scheduling system. Also, this dynamic approach gives the flexibility to postpone the targeting decision right before the moment when the application is going to playout, e.g., be executed.

Various exemplary features will now be described in the context of an exemplary implementation in which an EBIF User Agent running on a STB implements addressability functionality supporting targeted advertisements in accordance with the present invention. Examples of a suitable format for an Addressability Qualifier Set (AQS) used in some embodiments will be described below. Also how to deliver and manage addressability data to a STB, how to refer to that data by EBIF application, etc. will be described Also described are approaches to how to achieve targeting including what the Targeting Qualifier Set format (TQS) can, and in some embodiments is, and how a User Agent can use the TQS data in combination with received application targeting rules, e.g., constraint logic, in deciding whether or not to launch a targeted application portion, e.g., an entire application or sub-element of an application are described.

Addressability Qualifier Set Format

In some embodiment the Addressability Qualifier Set format that is used is transparent to the ETV EBIF User Agent operating on the STBs. A Client Platform sometime referred to herein by the identifier (DN which stands for Digital Naviator), is also implemented in some embodiment in the STB. The Client platform is responsible in some embodiments for managing, e.g., storing and/or obtaining updates to, an Addressability Qualifier Set, e.g., a subscriber profile, cached in the STB on which the Client Platform is installed and running. In some embodiments Client Platform APIs are provided to allow a User Agent on the STB to access the subscriber profile information, e.g., including AQ values included in the stored subscriber profile, via the Client Platform.

In some embodiments a Client Platform (DN) downloads and manages the AQS and provides APIs for User Agent to query Qualifier's values by name.

In some embodiments a User Agent on a STB implements an event mechanism to notify an EBIF application of an AQS update event.

In some embodiments EBIF Applications access targeting information in a manner consistent with the current version of the EBIF standard using what are known as a Private User Preference Items.

In the current EBIF specification, Private User Preference Items' names are prefixed with "x-" or "X-".

For example, if a qualifier name is "HBOSubsciption", the corresponding private user preference item name would be "x-HBOSubscription" in some embodiments.

The qualifiers' accessability to EBIF application may restricted by business rules.

The Client Platform (DN) may implement this access policy. The DN APIs return success if access is OK. Otherwise, return failure. That is, if the specified Private User Preference Item's and the corresponding logical constraints are satisfied, success of the constraints for implementing a corresponding application or application part will be determined and the corresponding application part will be executed and/or otherwise used by the User Agent running on the STB. Otherwise the application corresponding to constraints will not be executed.

In EBIF specification, private user preference item maybe associated with an application having an identical Organization Identifier to an Organization Identifier included in the private user preference item. Thus, whether a private user preference constraint is satisfied depends, in at least some embodiments, on use of information corresponding to the same organization as the Organization Identified by the Organization Identifier included in the private user preference item. For example, in some embodiments satisfaction of a private user preference including a TWC identifier is determined to be satisfied or not using information included in a subscriber profile associated with, e.g., including, the same Organization Identifier (e.g., TWC) as the private user preference constraint being checked.

For targeting, a User Agent on a STB determines the access compatibility based on DN API's return result mentioned above, i.e., success or failure of a specified targeting constraint.

The private user preference items defined by the Addressable Qualifier Set are not mutable in some embodiments.

Consider the Following Addressability Qualifier Set (AQS) Example:

AQS Name is case-insensitive, value type should be well defined, like String, Integer, Boolean, Integer Range, String Range, etc. Detailed definitions are outside of this document's scope.

A User Agent retrieves AQS values by name through DN APIs. So the AQS data format is transparent to User Agent running on the STB.

The following is an example of an AQS set in XML format. It contains 5 qualifiers:

```
<?xml version="1.0" encoding="UTF-8"?>
<data>
    <SisEbifQualifier>
        <row number="1">
            <name>Age</name>
            <value>40</value>
            <type>Integer</type>
        </row>
        <row number="2">
            <name>City</name>
            <value>Horsham</value>
            <type>String</type>
        </row>
        <row number="3">
            <name>FirstName</name>
            <value>John</value>
            <type>String</type>
        </row>
```

-continued

```
        <row number="4">
            <name>HBOSubscription</name>
            <value>TRUE</value>
            <type>Boolean</type>
        </row>
        <row number="5">
            <name>Sex</name>
            <value>Male</value>
            <type>String</type>
        </row>
    </SisEbifQualifier>
</data>
```

Exemplary STB Subscriber Profile:

The following exemplary STB profiles show 5 addressable qualifiers available for targeting purposes, e.g., available to EBIF targeting applications. The exemplary subscriber profiles are loaded onto the STB corresponding to the subscriber to which the profile relates. The subscriber profiles 1 include addressable qualifiers which are consistent with and intended to be used in a system where the above exemplary AQS set is used. In the following exemplary subscriber profiles, the addressable qualifier name precedes the value of the addressable qualifier.

Exemplary Subscriber Profile 1—For Subscriber 1 Corresponding to STB 1

1) "Age"—40
2) "City"—Horsham
3) "FirstName"—John
4) "HBOSubscription"—true
5) "Sex"—Male Exemplary Subscriber Profile 2—For Subscriber 2 Corresponding to STB 2

6) "Age"—22
7) "City"—Horsham
8) "FirstName"—Jane
9) "HBOSubscription"—False
10) "Sex"—F An example of a Targeting Qualifier Set (TQSs) will now be described.

EBIF targeted applications may be associated with a Targeting Qualifier Set, which includes targeting qualifiers which are a subset of a STB's Addressability Qualifier Set plus one or more logical set operators such as "All", "Any" or "None" that are used when determining if the qualifier values in a TQS match the corresponding addressable qualifier values in a STB's AQS.

In some embodiments TQS data is formatted in an EBIF data resource with multiple tables, each table includes matching logic, an application lid (local identifier) and a set of qualifiers for matching purposes.

Targeting Qualifier Set location information is delivered to STBs along with the STBs associated application signaling. TQS information maybe, and in some embodiments are communicated to a STB in an Application Information Descriptor's private data field, e.g., as private Metadata in a MPEG transport or program stream.

In some embodiment the Targeting Qualifier Set includes data provided in a standard EBIF data resource format. For example, if the EBIF resource is generated using TvWorks XDK authoring tool, the following is an example of what its XML file looks like:

```xml
<?xml version="1.0" encoding="UTF-8"?>
<data>
        <TQS>
                <row>
                        <name>op</name>
                        <value>All</value>
                        <type>string</value>
                </row>
                <row>
                        <name>app</name>
                        <value>male.pr</value>
                        <type>string</value> </row>
                <row>
                        <name>City</name>
                        <value>Horsham</value>
                        <type>string</value>
                </row>
                <row>
                        <name>Sex</name>
                        <value>Male</value>
                        <type>string</value>
                </row>
        </TQS>
<TQS>
                <row>
                        <name>op</name>
                        <value>Any</value>
                        <type>string</value>
                </row>
                <row>
                        <name>app</name>
                        <value>femal.pr</value>
                        <type>string</value>
                </row>
                <row>
                        <name>City</name>
                        <value>Broomfield</value>
                        <type>string</value>
                </row>
                <row>
                        <name>Sex</name>
                        <value>Female</value>
                        <type>string</value>
                </row>
</TQS>
<TQS> ... </TQS>
...
<TQS> ... </TQS>
</data>
```

Keywords:
- TQS—XML tag, defines one group of viewers sharing the same targeting EBIF application with same matching criteria.
- op—The first element of TQS, indicate what logic operation apply To all the qualifiers. Valid values are "Any", "All" and "None", they are case-insensitive
- app—second element of TQS, indicate what EBIF application to run after all qualifiers matched. Its value MUST be relative name. No absolute name is allowed. The app shares the same path as the initial page resource LID path.

City, Sex . . . —All other elements define targeting qualifier Names. They could be put in any row.

"String", "Integer", "Boolean"—are the only valid enumeration values for $3^{rd}$ column, which inform User Agent that that's the value type to compare.

For string type, User Agent compare the value as string, case insensitive.

For Integer type, User Agent compare the value as integer.

For Boolean type, User Agent compare the value as Boolean type, empty string means FALSE. Any other string means TRUE.

Any other unknown type Should be treated as String type.

Various approaches to ETV Targeting Engine Logic may be used in accordance with the invention.

Two approaches for an ETV Targeting Engine to implement targeting logic are discussed below.

Targeting Approach 1—Platform software (User Agent) applies matching logic of "All", "Any" or "None" to dispatch the matched EBIF application.

According to TQS described above, the matched application will be launched. Otherwise the default EBIF application defined in normal Application Information Descriptor's initial page resource will be launched.

In such an embodiment an ETV User Agent operating on a STB is responsible for retrieving the TQS data information including a targeted application URL, logical set operator value and/or matching name/value pairs. Once the User Agent gets this information, it will download the application from an EBIF carousel, e.g., includes in the network headend, and run the targeted application.

Targeting Approach 2—A Single EBIF application applies the targeting logic itself by querying addressability qualifiers by name. Then based on the targeting rules, it can apply the matched resources to display the targeted UIs, etc.

In various embodiments system elements described herein are implemented using one or more modules which are used to perform the steps corresponding to one or more methods of the present invention, for example, receiving user inputs, receiving a subscriber profile associated with a customer device, e.g., a set top box, determining if conditions relating to a set of target qualifier values corresponding to a portion of an application are satisfied by the one or more addressable qualifier values in received subscriber profile, executing at least a portion of an application on the customer device.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step. In some embodiments various modules used in the devices and/or systems described above can be implemented in hardware, e.g., as individual circuits. Alternatively, the modules may be implemented in software and stored in the memory of the device/server/system. Completely hardware based or completely software based modules may be used. However, it should be appreciated that any combination of software and hardware (e.g., circuit implemented) modules may be used to implement various functions.

While described in the context of EBIF applications it should be appreciated that the methods and apparatus of the present invention are not limited to EBI applications. In addition, while described in the context of STB applications, the methods and apparatus of the present invention can be used in other devices such as handheld content playback devices and/or other media playback devices. In such cases the target qualifier sets would be received and stored in the device implementing the method with the addressable qualifier set 300, 1200 including values based on the user of the handheld or other media playback device.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a set top box, the method comprising:
receiving from a server, at the set top box, a subscriber profile associated with the set top box, including one or more addressable qualifier values, said one or more addressable qualifier values including at least one of an age value, sex value, income value or service subscription value;
receiving at least one target qualifier value corresponding to a first portion of an application in a private EBIF User Preference Item, wherein the EBIF User Preference Item includes at least one Private User Preference Item name which is prefixed with an "x-" or "X-", said application being an EBIF application and said first portion of said application being a first User Interface portion of said application;
determining, at the set top box, if conditions relating to a set of target qualifier values corresponding to the first portion of the application are satisfied by the one or more addressable qualifier values in said subscriber profile; and
executing, at the set top box, said first portion of said application when it is determined that said conditions relating to the set of target qualifier values corresponding to the first portion of said application are satisfied by said one or more addressable qualifier values in said subscriber profile, said first User Interface portion being one of a plurality of different User Interface portions executable by a User Agent on the set top box depending on a result of said determining if said conditions are satisfied.

2. The method of claim 1, further comprising:
receiving said application including said first portion of the application at said set top box in an MPEG transport stream.

3. The method of claim 1,
wherein said set top box is a customer premise device;
wherein said subscriber profile includes an income value; and
wherein said first portion of said application is a portion of an EBIF application.

4. The method of claim 3,
wherein said subscriber profile further includes a sex value; and
wherein said first portion of said application is one of a plurality of different user interface portions of said application.

5. The method of claim 3, wherein said first portion of said application is the entire EBIF application.

6. The method of claim 3, further comprising:
receiving said set of target qualifier values corresponding to said first portion of an application and said conditions relating to said set of target qualifier values in a private EBIF User Preference Item.

7. The method of claim 6,
wherein at least one Private User Preference Item further includes a first Organization Identifier.

8. The method of claim 7, wherein said subscriber profile is associated with said first Organization Identifier, said addressable qualifier values included in said subscriber profile being used for comparison to target qualifier values included in Private User Preference Items that include said first Organization Identifier but not for comparison to target qualifier values in Private User Preference Items that do not include said first Organization Identifier.

9. The method of claim 1, further comprising:
receiving said set of target qualifier values corresponding to said first portion of an application and said conditions relating to said set of target qualifier values in private meta-data communicated over a program channel used to communicate a video program.

10. The method of claim 1, wherein receiving at the set top box, the subscriber profile including at least one addressable qualifier value includes:
receiving one or more addressable qualifier values on a periodic basis from a server in a service provider's headend.

11. A method of operating a set top box, the method comprising:
sending a request for a subscriber profile including at least one addressable qualifier value to a server;
receiving, at the set top box, said subscriber profile associated with the set top box, said subscriber profile including one or more addressable qualifier values, said one or more addressable qualifier values including at least one of an age value, sex value, income value or service subscription value, wherein receiving said subscriber profile includes receiving said subscriber profile including at least one addressable qualifier value in response to said request;
receiving, at said set top box, at least one target qualifier value corresponding to a first portion of an application in a private EBIF User Preference Item, wherein the EBIF User Preference Item includes at least one Private User Preference Item name which is prefixed with an "x-" or "X-", said application being an EBIF application and said first portion of said application being a first User Interface portion of said application;
determining if conditions relating to a set of target qualifier values corresponding to the first portion of the application are satisfied by the one or more addressable qualifier values in said subscriber profile; and
executing said first portion of said application when it is determined that said conditions relating to the set of target qualifier values corresponding to the first portion of said application are satisfied by said one or more addressable qualifier values in said subscriber profile, said first User Interface portion being one of a plurality of different User Interface portions executable by a User Agent on the set top box depending on a result of said determining if said conditions are satisfied.

12. A set top box, including:
an interface including a receiver configured to receive a subscriber profile associated with the set top box including one or more addressable qualifier values, said one or more addressable qualifier values including at least one of an age value, sex value, income value or service subscription value and to receive at least one target qualifier value corresponding to a first portion of an application in a private EBIF User Preference Item, wherein the EBIF User Preference Item includes at least one Private User Preference Item name which is prefixed with an "x-" or "X-", said application being an EBIF application and said first portion of said application being a first User Interface portion of said application;

a determination module configured to determine if conditions relating to a set of target qualifier values corresponding to the first portion of the application are satisfied by the one or more addressable qualifier values in said subscriber profile; and an application control module configured to execute said first portion of said application when it is determined that said conditions relating to the set of target qualifier values corresponding to the first portion of said application are satisfied by said one or more addressable qualifier values in said subscriber profile, said first User Interface portion being one of a plurality of different User Interface portions executable by a User Agent on the set top box depending on a result of said determining if said conditions are satisfied.

13. The set top box of claim 12, wherein said receiver is configured to receive said subscriber profile from a server; and wherein said determination module includes a comparison module configured to compare an addressable qualifier value in said subscriber profile to a corresponding target qualifier value in said set of target qualifier values to determine if a condition, expressed as a logical operation between said addressable qualifier value in the subscriber profile and the corresponding target qualifier value, is satisfied.

14. The set top box of claim 12, further comprising:

a request generation module configured to generate a request to a server for the subscriber profile associated with the set top box.

15. The set top box of claim 14, wherein said first portion of said application is one of a plurality of different user interface portions of said application.

16. The set top box of claim 14, wherein said receiver is further configured to receive said set of target qualifier values corresponding to said first portion of an application and said conditions relating to said set of target qualifier values in a private EBIF User Preference Item.

17. The method of claim 2, wherein said application further includes at least a second portion, the method further comprising:

deciding, at the set top box, i) which portion or portions of said application to load on said set top box based on a match between information in the subscriber profile and target qualifier values corresponding to different portions of said application and ii) also deciding which portions or portions of said application not to load.

18. The method of claim 17, further comprising:

loading said first portion of said application onto said set top box in response to determining that a target qualifier value corresponding to the first portion of said application matches one or more addressable qualifier values in said received subscriber profile; and not loading said second portion of said application onto said set top box in response to determining that target qualifier values corresponding to the second portion of said application do not match one or more addressable qualifier values in said received subscriber profile.

* * * * *